United States Patent
Onggosanusi et al.

(10) Patent No.: US 12,126,411 B2
(45) Date of Patent: *Oct. 22, 2024

(54) 4Tx CODEBOOK ENHANCEMENT IN LTE

(71) Applicant: Texas Instruments Incorporated, Dallas, TX (US)

(72) Inventors: Eko Onggosanusi, Coppell, TX (US); Runhua Chen, Plano, TX (US); Ralf Bendlin, Cedar Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,466

(22) Filed: Jan. 23, 2023

(65) Prior Publication Data

US 2023/0163818 A1    May 25, 2023

Related U.S. Application Data

(63) Continuation of application No. 17/403,587, filed on Aug. 16, 2021, now Pat. No. 11,563,470, which is a (Continued)

(51) Int. Cl.
*H04B 7/04*    (2017.01)
*H04B 7/0417*   (2017.01)
(Continued)

(52) U.S. Cl.
CPC ......... *H04B 7/0456* (2013.01); *H04B 7/0417* (2013.01); *H04B 7/046* (2013.01);
(Continued)

(58) Field of Classification Search
CPC .. H04B 7/0469; H04B 7/0639; H04B 7/0456; H04B 7/0417; H04L 25/03898; H04L 25/0391

See application file for complete search history.

(56) References Cited

U.S. PATENT DOCUMENTS 8,842,772 B2    9/2014   Murakami et al.
9,281,881 B2    3/2016   Onggosanusi et al.
(Continued)

FOREIGN PATENT DOCUMENTS

CN    101877627 A    11/2010
CN    102237984 A    11/2011
(Continued)

OTHER PUBLICATIONS

"Subsampling of 8Tx codebooks", 3GPP TSG RAN WG1 Meeting #62Bis; R1-105165, Xi'an; Oct. 11-15, 2010 (5 pages).
(Continued)

*Primary Examiner* — Curtis B Odom
(74) *Attorney, Agent, or Firm* — Gregory J. Albin; Frank D. Cimino

(57) ABSTRACT

Channel state information (CSI) feedback in a wireless communication system is disclosed. A precoding matrix is generated for multi-antenna transmission based on precoding matrix indicator (PMI) feedback, wherein the PMI indicates a choice of precoding matrix derived from a matrix multiplication of two matrices from a first codebook and a second codebook. In one embodiment, the first codebook comprises at least a first precoding matrix constructed with a first group of adjacent Discrete-Fourier-Transform (DFT) vectors. In another embodiment, the first codebook comprises at least a second precoding matrix constructed with a second group of uniformly distributed non-adjacent DFT vectors. In yet another embodiment, the first codebook comprises at least a first precoding matrix and a second precoding matrix, where said first precoding matrix is constructed with a first group of adjacent DFT vectors, and said second precoding matrix is constructed with a second group of uniformly distributed non-adjacent DFT vectors.

5 Claims, 4 Drawing Sheets

Related U.S. Application Data continuation of application No. 16/989,587, filed on Aug. 10, 2020, now Pat. No. 11,095,346, which is a continuation of application No. 16/518,597, filed on Jul. 22, 2019, now Pat. No. 10,742,280, which is a continuation of application No. 15/698,015, filed on Sep. 7, 2017, now Pat. No. 10,361,760, which is a continuation of application No. 15/132,024, filed on Apr. 18, 2016, now Pat. No. 9,780,850, which is a continuation of application No. 14/863,156, filed on Sep. 23, 2015, now Pat. No. 9,319,121, which is a continuation of application No. 14/177,547, filed on Feb. 11, 2014, now Pat. No. 9,281,881.

(60) Provisional application No. 61/817,657, filed on Apr. 30, 2013, provisional application No. 61/812,459, filed on Apr. 16, 2013, provisional application No. 61/807,647, filed on Apr. 2, 2013, provisional application No. 61/777,664, filed on Mar. 12, 2013, provisional application No. 61/770,705, filed on Feb. 28, 2013, provisional application No. 61/769,463, filed on Feb. 26, 2013, provisional application No. 61/768,851, filed on Feb. 25, 2013, provisional application No. 61/763,804, filed on Feb. 12, 2013.

(51) Int. Cl.
*H04B 7/0456* (2017.01)
*H04B 7/06* (2006.01)

(52) U.S. Cl.
CPC ......... *H04B 7/0469* (2013.01); *H04B 7/0478* (2013.01); *H04B 7/0486* (2013.01); *H04B 7/0626* (2013.01); *H04B 7/0639* (2013.01)

(56) References Cited

U.S. PATENT DOCUMENTS

| | | | |
|---|---|---|---|
| 9,425,871 | B2 | 8/2016 | Onggosanusi |
| 11,563,470 | B2* | 1/2023 | Onggosanusi ......... H04B 7/046 |
| 2012/0218948 | A1 | 8/2012 | Onggosanusi et al. |
| 2012/0219042 | A1 | 8/2012 | Onggosanusi et al. |
| 2012/0269290 | A1 | 10/2012 | Onggosanusi et al. |
| 2012/0320862 | A1 | 12/2012 | Ko et al. |
| 2013/0308715 | A1 | 11/2013 | Nam et al. |

FOREIGN PATENT DOCUMENTS

| | | |
|---|---|---|
| EP | 2536058 A1 | 12/2012 |
| WO | 2012046144 A1 | 4/2012 |
| WO | 2012063980 A1 | 5/2012 |
| WO | 2012093742 A1 | 7/2012 |

OTHER PUBLICATIONS

"4Tx Codebook Enhancement in Ref. 12," 3GPP TSG RAN WG1 #72, R1-130825, Texas Instruments, St. Julian's Malta, Jan. 28-Feb. 1, 2013 (4 pages).

"On 4-Tx Feedback," 3GPP TSG-RAN WG1 Meeting #62, R1-104446, Nokia, Nokia Siemens Network, Madrid, Spain, Aug. 23-27, 2010 (11 pages).

Prosecution History, U.S. Appl. No. 14/177,547, filed Feb. 11, 2014, 214 pages.

Prosecution History, U.S. Appl. No. 14/863,156 filed Sep. 23, 2015, 237 pages.

Prosecution History, U.S. Appl. No. 15/055,195 filed Feb. 26, 2016, 172 pages.

Prosecution History, U.S. Appl. No. 15/132,024, filed Apr. 18, 2016, 326 pages.

Prosecution History, U.S. Appl. No. 15/698,015, filed Sep. 7, 2017, 250 pages.

Prosecution History, U.S. Appl. No. 16/518,597, filed Jul. 22, 2019, 187 pages.

Prosecution History, U.S. Appl. No. 16/989,587, filed Aug. 10, 2020, 219 pages.

Prosecution History, U.S. Appl. No. 17/403,587, filed Aug. 16, 2021, 186 pages.

Communication pursuant to Article 94(3) EPC, European Application No. 14751985.4, 7 pages.

Fourth Office Action dated Aug. 27, 2021, Chinese Application No. 201610414091.2, 11 pages.

"Design and Evaluation of Precoder Codebooks for CSI Feedback," 3GPP TSG-RAN WG 1 #61bis, R1-103839, Ericsson, ST-Ericsson, Dresden, Germany, Jun. 28-Jul. 12, 2010, 12 pages.

Notification of First Office Action dated Sep. 16, 2021, Chinese Application No. 202010458753.2, 16 pages.

Notification of First Office Action dated Sep. 9, 2021, Chinese Application No. 202010452849.8, 16 pages.

Decision of Rejection dated Jan. 24, 2022, Chinese Application No. 201610414091.2, 13 pages.

* cited by examiner

4Tx CODEBOOK ENHANCEMENT IN LTE

CROSS-REFERENCE TO RELATED APPLICATIONS

This application is a continuation of application Ser. No. 17/403,587 filed Aug. 16, 2021; which is a continuation of application Ser. No. 16/989,587 filed Aug. 10, 2020, now U.S. Pat. No. 11,095,345 granted Aug. 17, 2021; which is a continuation of application Ser. No. 16/518,597 filed Jul. 22, 2019, now U.S. Pat. No. 10,742,280 granted Aug. 11, 2020; which is a continuation of application Ser. No. 15/698,015, filed Sep. 7, 2017, now U.S. Pat. No. 10,361,760, granted Jul. 23, 2019; which is a continuation of application Ser. No. 15/132,024, filed Apr. 18, 2016, now U.S. Pat. No. 9,780,850, granted Oct. 3, 2017; which is a continuation of application Ser. No. 14/863,156, filed Sep. 23, 2015, now U.S. Pat. No. 9,319,121, granted Apr. 19, 2016; which is a continuation of application Ser. No. 14/177,547, filed Feb. 11, 2014, now U.S. Pat. No. 9,281,881, granted Mar. 8, 2016; which claims the benefit of U.S. Provisional Patent Application No. 61/763,804, filed on Feb. 12, 2013; U.S. Provisional Patent Application No. 61/768,851, filed on Feb. 25, 2013; U.S. Provisional Patent Application No. 61/769,463, filed on Feb. 26, 2013; U.S. Provisional Patent Application No. 61/770,705, filed on Feb. 28, 2013; U.S. Provisional Patent Application No. 61/777,664, filed on Mar. 12, 2013; U.S. Provisional Patent Application No. 61/807,647, filed on Apr. 2, 2013; U.S. Provisional Patent Application No. 61/812,459, filed on Apr. 16, 2013; and U.S. Provisional Patent Application No. 61/817,657, filed on Apr. 30, 2013, all titled "4Tx Codebook Enhancement in Release 12." The disclosures of all of the above-mentioned applications are incorporated herein by reference in their entirety.

TECHNICAL FIELD

The technical field of this invention is wireless communication such as wireless telephony.

BACKGROUND

The present embodiments relate to wireless communication systems and, more particularly, to the precoding of Physical Downlink Shared Channel (PDSCH) data and dedicated reference signals with codebook-based feedback for multi-input multi-output (MIMO) transmissions.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Channel State Information Reference Signals (CSI-RS) and Dedicated or Demodulating Reference Signals (DMRS). These reference signals are useful for channel estimation at the receiver.

In multi-input multi-output (MIMO) communication systems with multiple transmit/receive antennas, the data transmission is performed via precoding. Here, precoding refers to a linear (matrix) transformation of L-stream data into P-stream where L denotes the number of layers (also termed the transmission rank) and P denotes the number of transmit antennas. With the use of dedicated (i.e. user-specific) DMRS, a transmitter, such as a base station or eNodeB (eNodeB), can perform precoding operations that are transparent to user equipment (UE) acting as receivers. It is beneficial for the base station to obtain a precoding matrix recommendation from the user equipment. This is particularly the case for frequency-division duplexing (FDD) where the uplink and downlink channels occupy different parts of the frequency bands, i.e. the uplink and downlink are not reciprocal. Hence, a codebook-based feedback from the UE to the eNodeB is preferred. To enable a codebook-based feedback, a precoding codebook needs to be designed.

The Long-Term Evolution (LTE) specification includes codebooks for 2-antenna, 4-antenna, and 8-antenna transmissions. While those codebooks are designed efficiently, the present inventors recognize that still further improvements in downlink (DL) spectral efficiency are possible. Accordingly, the preferred embodiments described below are directed toward these problems as well as improving upon the prior art.

SUMMARY

Systems and methods for channel state information (CSI) and precoding matrix indicator (PMI) feedback in a wireless communication system are disclosed. A precoding matrix is generated for multi-antenna transmission based on a precoding matrix indicator (PMI) feedback from at least one remote receiver wherein the PMI indicates a choice of precoding matrix derived from a matrix multiplication of two matrices from a first codebook and a second codebook. One or more layers of a data stream are precoded with the precoding matrix and transmitted to the remote receiver.

In one embodiment, a method of CSI feedback and transmitting data in a wireless communication system comprises receiving one or more precoding matrix indicator (PMI) signals from a remote transceiver. The PMI signals indicating a choice of a precoding matrix W. The system generates the precoding matrix W from a matrix multiplication of two matrices $W_1$ and $W_2$. Matrix W is termed the composite precoder. Matrix $W_1$ targets wideband/long-term channel properties, and matrix $W_2$ targets frequency-selective/short-term channel properties. Each of the components $W_1$, $W_2$ is assigned a codebook. Hence, two distinct codebooks are needed: $C_1$ and $C_2$. Matrix $W_1$ is selected from a first codebook $C_1$ based on a first group of bits in the PMI signals, and matrix $W_2$ is selected from a second codebook $C_2$ based on a second group of bits in the PMI signals.

Proposed first and second codebooks $C_1$ and $C_2$ are defined below for different ranks and different PMI bit lengths.

In one embodiment, one or more layers of a data stream are precoded by multiplication with the precoding matrix W. The precoded layers in the data stream are then transmitted to the remote receiver.

BRIEF DESCRIPTION OF THE DRAWINGS

These and other aspects of this invention are illustrated in the drawings, in which.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Figure 1:
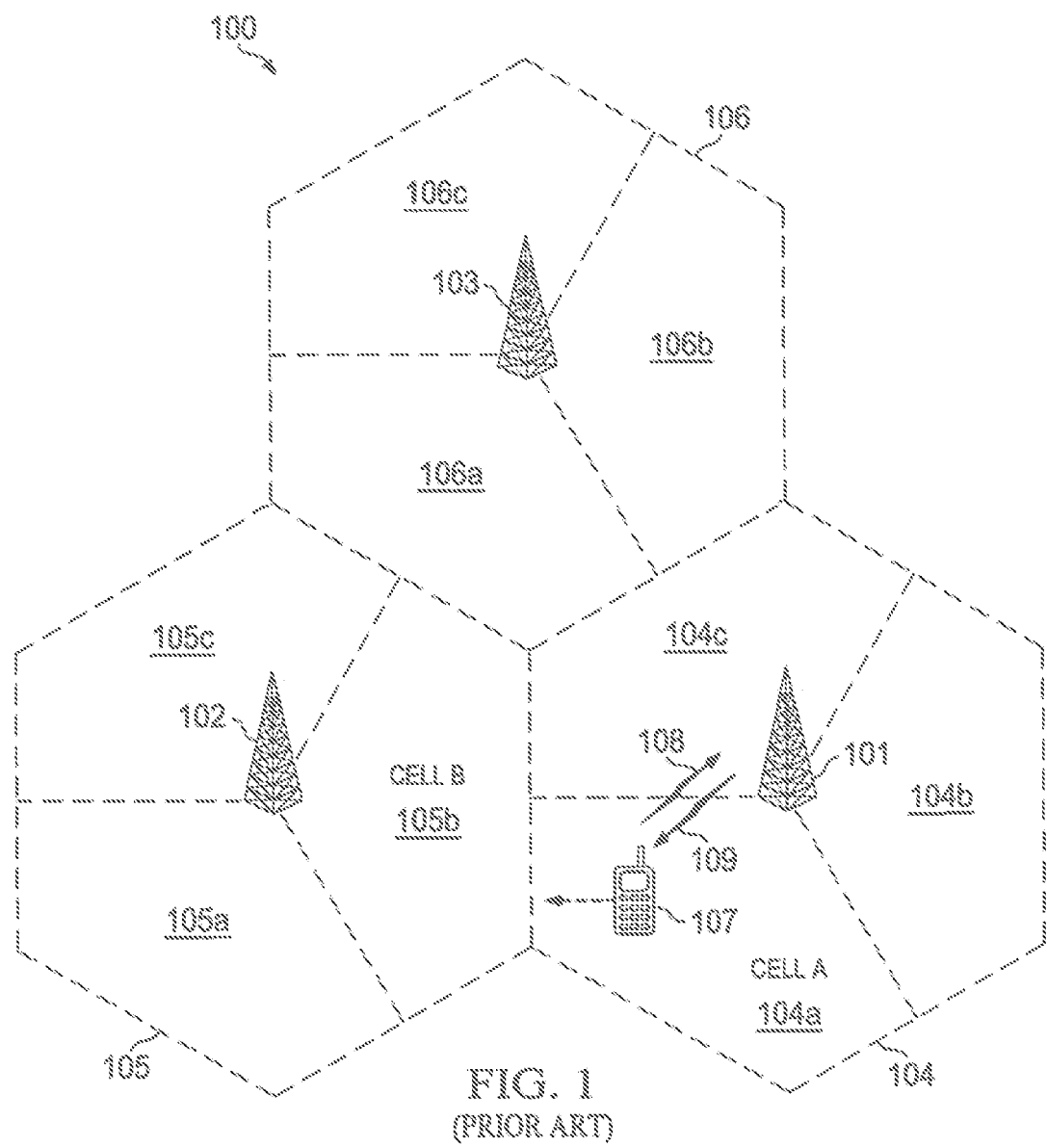
FIG. 1 illustrates an exemplary wireless telecommunications network.

FIG. 1 illustrates an exemplary wireless telecommunications network 100. Network 100 includes a plurality of base stations 101, 102 and 103. In operation, a telecommunications network necessarily includes many more base stations. Each base station 101, 102 and 103 (eNodeB) is operable over corresponding coverage areas 104, 105 and 106. Each base station's coverage area is further divided into cells. In the illustrated network, each base station's coverage area is divided into three cells 104a-c, 105a-c, 106a-c. User equipment (UE) 107, such as telephone handset, is shown in Cell A 104a. Cell A 104a is within coverage area 104 of base station 101. Base station 101 transmits to and receives transmissions from UE 107. As UE 107 moves out of Cell A 104a and into Cell B 105b, UE 107 may be handed over to base station 102. Because UE 107 is synchronized with base station 101, UE 107 can employ non-synchronized random access to initiate handover to base station 102.

Non-synchronized UE 107 also employs non-synchronous random access to request allocation of uplink 108 time or frequency or code resources. If UE 107 has data ready for transmission, which may be traffic data, measurements report, tracking area update, UE 107 can transmit a random access signal on uplink 108. The random access signal notifies base station 101 that UE 107 requires uplink resources to transmit the UEs data. Base station 101 responds by transmitting to UE 107 via downlink 109, a message containing the parameters of the resources allocated for UE 107 uplink transmission along with a possible timing error correction. After receiving the resource allocation and a possible timing advance message transmitted on downlink 109 by base station 101, UE 107 optionally adjusts its transmit timing and transmits the data on uplink 108 employing the allotted resources during the prescribed time interval.

Base station 101 configures UE 107 for periodic uplink sounding reference signal (SRS) transmission. Base station 101 estimates uplink channel quality information (CSI) from the SRS transmission. The preferred embodiments of the present invention provide improved communication through precoded multi-antenna transmission with codebook-based feedback. In a cellular communication system, a UE is uniquely connected to and served by a single cellular base station or eNodeB at a given time. An example of such a system is the 3GPP LTE system, which includes the LTE-Advanced (LTE-A) system. With an increasing number of transmit antennas at the eNodeB, the task of designing an efficient codebook with desirable properties is challenging.

CSI consists of Channel Quality Indicator (CQI), precoding matrix indicator (PMI), precoding type indicator (PTI), and/or rank indication (RI). The time and frequency resources that can be used by the UE to report CSI are controlled by the eNodeB.

In one embodiment, a dual-stage codebook for CSI feedback is based on the product structure proposed in:

$$W = W_1 W_2 \quad (1)$$

where $W_1$ targets wideband/long-term channel properties and $W_2$ targets frequency-selective/short-term channel properties. Each of the components $W_1$, $W_2$ is assigned a codebook. Hence, two distinct codebooks are needed: $CB_1$ and $CB_2$. W is termed the composite precoder. The choice of $W_1$ and $W_2$ are indicated via $PMI_1$ and $PMI_2$.

The following principles are enforced for codebook designs:
(1) Finite alphabet for W: each matrix element belongs to a finite set of values or constellation (e.g., M-PSK alphabet).
(2) Constant modulus for W: all elements in a precoding matrix have the same magnitude. This is important to facilitate power amplifier (PA) balance property in all scenarios. Note that constant modulus is a sufficient condition for PA balance, but not a necessary condition. However, enforcing constant modulus property tends to result in a simpler codebook design. Note also that while the precoding codebook (for feedback) conforms to the constant modulus property, this does not restrict the eNodeB from using non-constant modulus precoder. This is possible due to the use of UE-specific RS for demodulation.
(3) Nested property for W: every matrix/vector of rank-n is a sub-matrix of a rank-(n+1) precoding matrix, n=1, 2, . . . , N−1 where N is the maximum number of layers. While this property is desirable as it allows to reduce the complexity of PMI selection, it is not necessary to facilitate rank override if UE-specific RS is used.
(4) The associated feedback signaling overhead should be minimized. This is achieved by a balance between the overhead associated with $W_1$ (wideband, long-term) and $W_2$ (sub-band, short-term). Here, both the time (feedback rate) and frequency (feedback granularity) dimensions are important.
  (a) Blindly increasing the size of $CB_1$ (while reducing the size of $CB_2$) does not guarantee reducing the overall feedback overhead if a certain level of performance is expected. If the codebook $CB_1$ is meant to cover a certain precoder sub-space with a given spatial resolution, increasing the size of $CB_1$ demands an increase in feedbacks signaling associated with $W_1$, both in time and frequency. This is because $CB_1$ starts to capture shorter-term channel properties, which are meant to be parts of $CB_2$.
  (b) To ensure that $CB_1$ does not need to be updated too frequently (in time and frequency), $CB_1$ should capture long-term channel properties such as the antenna setup and a range of values of angle of departure (AoD) which are associated with spatial correlation.
  (c) The design should strive to keep the maximum overhead associated with $W_2/CB_2$ the same as the Release 8 PMI overhead (i.e., ≤4 bits).
(5) Unitary precoder for W: (the column vectors of a precoder matrix must be pair-wise orthogonal to one another), while not necessary, is a sufficient condition for maintaining constant average transmitted power. This constraint is also used in designing the codebook at least for some relevant ranks.

The design of a 4Tx codebook for LTE disclosed herein targets an enhancement for multi-user (MU) MIMO over the 4Tx codebook in LTE Release 8. Rather than redesigning the 4Tx codebook, the enhancements disclosed herein focus on enhancing the MU-MIMO performance because the LTE Release 8 4Tx codebook was already designed to offer competitive performance for single-user (SU) MIMO (while keeping MU-MIMO in mind with the support of 8 discrete Fourier transform (DFT) vectors in the rank-1 codebook). Based on this consideration, the 4Tx enhancement focuses on rank-1 and at most rank-2 where MU-MIMO becomes relevant.

In terms of antenna setups, three setups may be considered:
two dual-polarized elements with λ/2 (half wavelength) spacing between two elements,
two dual-polarized elements with 4λ. (larger) spacing between two elements, and
uniform linear array (ULA) with λ/2 (half wavelength) spacing.

The first and the second setups have the highest priority. Good performance should be ensured for dual (i.e., cross) polarized antenna arrays with both small and large spacing.

Figure 2:
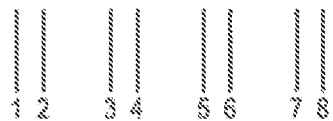
FIG. 2 illustrates a uniform linear array (ULA) or four pairs of ULA elements.
Figure 3:
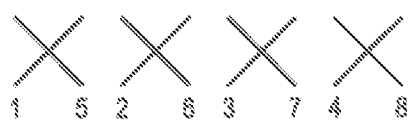
FIG. 3 illustrates four pairs of cross-polarized arrays.

The antenna element indexing shown in FIGS. 2 and 3 is use enumerate the spatial channel coefficients $H_{n,m}$, where n and m are the receiver and transmitter antenna indices, respectively. FIG. 2 illustrates a ULA or four pairs of ULA elements indexed 1-8. FIG. 3 illustrates four pairs of cross-polarized arrays. The indexing for the four pairs of cross-polarized antennas represents grouping two antennas with the same polarization, which tend to be more correlated. This is analogous to the indexing of 4 pairs of ULA in FIG. 2.

Proposed Codebook Structure

The following notation is used to define the codebooks below:
W: 4Tx feedback precoding matrix.
$W_1$: first feedback precoding matrix
$W_2$: second feedback precoding matrix
$i_1$: PMI index of $W_1$
$i_2$: PMI index of $W_2$
N: maximum number of layers
$N_{TXA}$: number of transmit antennas
$I_k$: (k×k)-dimensional identity matrix Following the guideline of using the same principle for 4Tx enhancement and 8Tx, the block diagonal grid-of-beam (GoB) structure is used. This structure is common between 4Tx and 8Tx.

$W_1$ and the associated codebook can be written as follows:

$$B = [b_0 \ b_1 \ \cdots \ b_{N-1}] \quad (2)$$

$$[B]_{1+m,1+n} = e^{j\frac{2\pi mn}{N}}, m = 0, 1, \cdots, \frac{N_{TXA}}{2} - 1 \ n = 0, 1, \cdots, N-1 \quad (3)$$

$$X^{(k)} \in \left\{ \begin{bmatrix} b_{(N_b k) \bmod N} \ b_{(N_b k+1) \bmod N} \ \cdots \ b_{(N_b k + N_b - 1) \bmod N} \end{bmatrix} : k = 0, \right. \quad (4)$$

$$\left. 1, \cdots, \frac{N}{N_b} - 1 \right\}$$

$$W_1^{(k)} = \begin{bmatrix} X^{(k)} & 0 \\ 0 & X^{(k)} \end{bmatrix}, \ C_1 = \left\{ W_1^{(0)}, W_1^{(1)}, W_1^{(2)}, \cdots, W_1^{(N/N_b)-1} \right\} \quad (5)$$

Here, different $W_1$ matrices represent a partitioning (without overlap) in terms of beam angles:
$W_1$ is a block diagonal matrix of size X where X is a $(N_{TXA}/2) \times N_b$ matrix. Nb denotes the number of adjacent $(N_{TXA}/2)$–Tx DFT beams contained in X. Such a design is able to synthesize N $(N_{TXA}/2)$–Tx DFT beams within each polarization group. For a given N, the spatial oversampling factor is essentially (N/2). The overall $(N_{TXA}/2)$–Tx DFT beam collections are captured in the $(N_{TXA}/2) \times N$ matrix B.
By using co-phasing in $W_2$ (described below), the composite precoder W can synthesize up to N DFT beams.
For 4Tx, it should be noted that the Release 8 rank-1 codebook already contains eight 4Tx DFT beams.
The set of $W_1$ matrices represents (N/Nb)-level partitioning (hence non-overlapping) of the N beam angles (in X, i.e. each polarization group).
This design results in a codebook size of (N/Nb) for $W_1$.

If some overlap in the set of beam angles is desired between two different $W_1$ matrices, the above formulation can be slightly modified such that two consecutive X matrices consists of some overlapping beam angles. Overlapping in beam angles may be beneficial to reduce "edge effects", i.e. to ensure that a common $W_1$ matrix can be better chosen for different resource blocks (RBs) within the same precoding sub-band when sub-band precoding or CSI feedback is used. Herein a sub-band refers to a set of continuous physical resource blocks (PRB). With overlapping, $$X^{(k)} \in \left\{ \begin{bmatrix} b_{(N_b k/2) \bmod N} \ b_{(N_b k/2+1) \bmod N} \ \cdots \ b_{(N_b k/2 + N_b - 1) \bmod N} \end{bmatrix} : k = 0, \right. \quad (6)$$

$$\left. 1, \cdots, \frac{2N}{N_b} - 1 \right\}$$

$$W_1^{(k)} = \begin{bmatrix} X^{(k)} & 0 \\ 0 & X^{(k)} \end{bmatrix}, \ C_1 = \left\{ W_1^{(0)}, W_1^{(1)}, W_1^{(2)}, \cdots, W_1^{(2N/N_b)-1} \right\} \quad (7)$$

This enhancement targets MU-MIMO improvement and, therefore, is designed for rank-1 (and at most rank-2). At the same time, the Release 8 4Tx codebook should still be used at least for SU-MIMO. Keeping in mind that dynamic switching (switching without RRC configuration) between SU-MIMO and MU-MIMO is the baseline assumption for Release 12, an eNodeB should be able to use the Release 8 4Tx and the enhanced components interchangeably (i.e. the switching between the two components should be dynamic). Thanks to the dual-stage feedback structure and in particular the $W=W_1*W_2$ structure, this can be realized in a simple and natural manner. The enhanced component can be augmented or combined with the Release 8 codebook as follows:
the Release 8 4Tx codebook is used as the codebook for $W_2$ and associated with $W_1$=identity matrix;
when $PMI_1$ indicates that $W_1$=identity matrix is chosen, $CB_2$ is chosen as the original Rel-8 codebook;
else, when $PMI_1$ indicates some other $W_1$, $W_1$ and $CB_2$ are chosen as the enhanced component.

The above switching/augmentation mechanism features the following:
best possible 4Tx MU-MIMO codebook enhancement opportunity. This is because the optimization effort for the new components can be focused on improving MU-MIMO without the need for considering the SU-MIMO performance (which is covered by the Release 8 4Tx codebook). Furthermore, the new components can be designed "from scratch" as the above augmentation mechanism with Release 8 4Tx codebook can be done without constraining any of the structures of the new components.

maintain best possible performance for 4Tx SU-MIMO without additional standardization effort. This comes from the use of Release 8 4Tx codebook. It is noted that the Release 8 4Tx codebook offers competitive performance in various antenna and channel setups including dual-polarized arrays as pointed out partly due to the inherent block diagonal structure in a number of the precoder matrices/vectors.

achieve flexible frequency-selective precoding with physical uplink shared channel (PUSCH) mode 3-2. If Release 8 codebook is not re-used and the new codebook is entirely based on the $W=W_1W_2$ structure, all subband PMI must fall in the same Grid-of-Beam (GoB) due to the wideband $W_1$ constraint. This inevitably limits the precoding gains of mode 3-2 and system performance. On the contrary, by augmenting the Release 8 codebook, all Release 8 PMI vectors can be used on each subband independently without any constraint. This is critical to ensure flexible subband precoding.

The design for $W_2$ (based on co-phasing and selection) follows the structure used for 8Tx codebook design. Co-phasing allows some phase adjustment between the two polarization groups and generation of 4Tx DFT×DFT vectors from two block diagonal 2Tx DFT×DFT matrices. The (group) selection operation allows refinement/adjustment of beam angles across RBs within the same sub-band thereby maximizing frequency-selective precoding gain.

The combination of beam selection and co-phasing in $W_2$—combined with $W_1$—should result in a unitary precoder $W=W_1W_2$.

An example of a complete design with non-overlapping block diagonal GoB augmentation of (N,Nb) codebook is given in the subsequent sections. It is straightforward to extend the proposed designs to include adjacent $W_1$ matrix overlapping, but is omitted here due to simplicity.

$$B = [b_0 \ b_1 \ \cdots \ b_{N-1}], \ [B]_{1+m,1+n} = e^{j\frac{2\pi mn}{N}}, \quad (8)$$

$$m = 0, 1 \ n = 0, 1, \cdots, N-1$$

$$X^{(k)} \in \quad (9)$$

$$\{[b_{(N_b k) \bmod N} \ b_{(N_b k+1) \bmod N} \ \cdots \ b_{(N_b k+N_b-1) \bmod N}] : k = 0, \ldots N/N_b - 1\}$$

Rank 1

Assuming (N, Nb)=(8,4) as an example.

$$W_1 \in C_1 = \left\{I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix}\right\} \quad (10)$$

→size-3 (Rel-8 codebook augmented with block diagonal GoB).

When $W_1=I_4$, then $W_2 \in C_{2,R8Tx4r1}$, where $C_{2,R8Tx4r1}$ denotes the Release 8 4Tx rank-1 codebook used for $W_2$.

When $$W_1 = \begin{bmatrix} X^{(k)} & 0 \\ 0 & X^{(k)} \end{bmatrix} (k = 0, 1),$$

then $$W_2 \in CB_2 = \left\{\frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\},$$

$$Y \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\}$$

The rank-1 PMI overhead for this example is shown in Table 1.

TABLE 1

| | W1 overhead (wideband) | W2 overhead (subband) |
|---|---|---|
| Rank-1 | log2(3)-bits | 4-bit |

Other values of (N, Nb) are not precluded if justified by sufficient system performance gain and reasonable feedback overhead.

Note that the block-diagonal enhancement components are sub-matrices of a subset of the Release 10 8Tx codebook. As such, the 4Tx GoB components can be obtained by pruning the 8Tx codebook for 4Tx MIMO feedback. This is discussed in more detail below.

N, Nb can also take other values. For example if (N, Nb)=(16, 4).

$$W_1 \in C_1 = \quad (11)$$

$$\left\{I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix}\right\}$$

→size-5 (Rel-8 codebook augmented with block diagonal GoB).

When $W_1=I_4$, then $W_2 \in C_{2,R8Tx4r1}$.

where $C_{2,R8Tx4r1}$ denotes the Release 8 4Tx rank-1 codebook used for $W_2$.

When $$W_1 = \begin{bmatrix} X^{(k)} & 0 \\ 0 & X^{(k)} \end{bmatrix} (k = 0, 1, 2, 3),$$

then $$W_2 \in CB_2 = \left\{\frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\},$$

$$Y \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\}$$

The rank-1 PMI overhead for this example is shown in Table 2.

TABLE 2

| | W1 overhead (wideband) | W2 overhead (subband) |
|---|---|---|
| Rank-1 | log2(5)-bits | 4-bit |

It is possible in some embodiments that the Release 12 4Tx codebook does not comprise the Release 8 codebook. In that case, the identity matrix $I_4$ is removed from the $W_1$ codebook $C_1$.

It is also possible to increase the value of N (e.g. to 32 or 64). This however increases the $C_1$ codebook size and feedback overhead, and reduces the span of angular spread that Nb adjacent beams can cover.

Rank 2:

Assuming (N,Nb)=(8,4) as an example:

$$W_1 \in C_1 = \left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix} \right\} \quad (12)$$

→size-3 (Rel-8 codebook augmented with block diagonal GoB).

When $W_1=I_4$, then $W_2 \in C_{2,R8Tx4r2}$,
where $C_{2,R8Tx4r2}$ denotes the Release 8 4Tx rank-2 codebook used for $W_2$.

When $$W_1 = \begin{bmatrix} X^{(k)} & 0 \\ 0 & X^{(k)} \end{bmatrix} (k = 0, 1),$$

then $$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\},$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

One minor shortcoming of this design is that the $W_2$ overhead is not constant, but varying dependent on the $W_1$ matrix. In particular, if $W_1=I$, $W_2$ overhead is 4-bits per subband; and
if $W_1$ corresponds to the block-diagonal component, $W_2$ overhead is 3-bits per subband.

Because $W_1$ and $W_2$ are jointly encoded in the PUSCH feedback mode, joint blind decoding of $W_1/W_2$ is required at the eNodeB, which may increase the eNodeB implementation complexity.

As one solution, the two columns in a rank-2 precoding matrix W may be chosen from different beams in one grid.

As an example, the following design is possible.

$$W_1 \in C_1 = \left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix} \right\} \quad (13)$$

→size-3 (Rel-8 codebook augmented with block diagonal GoB).

When $W_1=I_4$: then $W_2 \in C_{2,R8Tx4r2}$,
where $C_{2,R8Tx4r2}$ denotes the Release 8 4Tx rank-2 codebook used for $W_2$.

When $$W_1 = \begin{bmatrix} X^{(k)} & 0 \\ 0 & X^{(k)} \end{bmatrix} (k = 0, 1),$$

then $$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$(Y_1, Y_2) \in$ $\{(e_1^4, e_1^4), (e_2^4, e_2^4), (e_3^4, e_3^4), (e_4^4, e_4^4), (e_1^4, e_2^4), (e_2^4, e_3^4), (e_1^4, e_4^4), (e_2^4, e_4^4)\}$ where $e_q^p$ is a p×1 column vector with all elements equivalent to zero, except the q-th element which is 1. The $W_2$ overhead is 4-bits per subband, consistent with the Release 8 codebook overhead. Note that any other $(Y_1, Y_2)$ pair, denoted by $(e_m^4, e_n^4)$, are equally applicable, where $1 \leq m \leq 4$, $1 \leq n \leq 4$, $m \neq n$.

Note that in any of the $(Y_1, Y_2)$ pair above, the two selection vectors inside the brackets [ ] can be permuted. For example, $(e_1^4, e_2^4)$ can be replaced by $(e_2^4, e_1^4)$, and the resulting codebook is equivalently applicable.

It should be noted that that the block-diagonal enhancement components are sub-matrices of a subset of the Release 10 8Tx codebook.

As another solution, it can be resolved by adopting a (N, Nb)=(16, 8) codebook enhancement.

$$W_1 \in C_1 = \left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix} \right\} \quad (14)$$

→size-3 (Rel-8 codebook augmented with block diagonal GoB).

When $W_1=I_4$, then $W_2 \in C_{2,R8Tx4r2}$,
where $C_{2,R8Tx4r2}$ denotes the Release 8 4Tx rank-2 codebook used for $W_2$.

When $$W_1 = \begin{bmatrix} X^{(k)} & 0 \\ 0 & X^{(k)} \end{bmatrix} (k = 0, 1),$$

then $$W_2 \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\},$$

$$Y \in \left\{ \begin{bmatrix} 1 \\ 0 \\ 0 \\ 0 \\ 0 \\ 0 \\ 0 \\ 0 \end{bmatrix}, \begin{bmatrix} 0 \\ 1 \\ 0 \\ 0 \\ 0 \\ 0 \\ 0 \\ 0 \end{bmatrix}, \begin{bmatrix} 0 \\ 0 \\ 1 \\ 0 \\ 0 \\ 0 \\ 0 \\ 0 \end{bmatrix}, \begin{bmatrix} 0 \\ 0 \\ 0 \\ 1 \\ 0 \\ 0 \\ 0 \\ 0 \end{bmatrix}, \begin{bmatrix} 0 \\ 0 \\ 0 \\ 0 \\ 1 \\ 0 \\ 0 \\ 0 \end{bmatrix}, \begin{bmatrix} 0 \\ 0 \\ 0 \\ 0 \\ 0 \\ 1 \\ 0 \\ 0 \end{bmatrix}, \begin{bmatrix} 0 \\ 0 \\ 0 \\ 0 \\ 0 \\ 0 \\ 1 \\ 0 \end{bmatrix}, \begin{bmatrix} 0 \\ 0 \\ 0 \\ 0 \\ 0 \\ 0 \\ 0 \\ 1 \end{bmatrix} \right\}$$

The rank-2 PMI overhead for this example is shown in Table 3.

TABLE 3

| | W1 overhead (wideband) | W2 overhead (subband) |
|---|---|---|
| Rank-2 | log2(3)-bit | 4-bit |

Alternatively, it is possible that the Release 12 4Tx codebook does not comprise of the Release 8 codebook. In that case, the identity matrix is removed from the $W_1$ codebook $C_1$.

Another possible design is to use (N,Nb)=(16,4) as $$W_1 \in C_1 = \left\{ I_4, \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\} \quad (15)$$

→size-5 (Rel-8 codebook augmented with block diagonal GoB).

When $W_1 = I_4$, then $W_2 \in C_{2,R8Tx4r2}$, where $C_{2,R8Tx4r2}$ denotes the Release 8 4Tx rank-2 codebook used for $W_2$. When $$W_1 = \begin{bmatrix} X^{(k)} & 0 \\ 0 & X^{(k)} \end{bmatrix} (k=0, \ldots, 3),$$

then $$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$(Y_1, Y_2) \in$ $\{(e_1^4, e_1^4), (e_2^4, e_2^4), (e_3^4, e_3^4), (e_4^4, e_4^4), (e_1^4, e_2^4), (e_2^4, e_3^4), (e_1^4, e_4^4), (e_2^4, e_4^4)\}$

It is also possible to increase the value of N (e.g. to 32 or 64). This however increases the $C_1$ codebook size and feedback overhead, and reduces the span of angular spread that Nb adjacent beams can cover.

Rank 3:

The simplest solution is to reuse the Release 8 codebook as-is for Release 12.

$$W_1 = I_4 \quad (16)$$

→size-1 (Rel-8 codebook only).

$W_2 \in C_{2,R8Tx4r3}$, where $C_{2,R8Tx4r3}$ denotes the Release 8 4Tx rank-3 codebook used for $W_2$.

If enhancement based on (N,Nb) structure is warranted by sufficient performance gain, it can be done in a similar fashion as for rank-1 and rank-2. For instance, based on a (N,Nb)=(4,4) design:

$$W_1 \in C_1 = \left\{ I_4, \begin{bmatrix} X^{(0)} & 0 \\ 0 & X^{(0)} \end{bmatrix} \right\} \quad (17)$$

→size-2 (Rel-8 codebook augmented with block diagonal GoB).

When $W_1 = I_4$, then $W_2 \in C_{2,R8Tx4r3}$, where $C_{2,R8Tx4r3}$ denotes the Release 8 4Tx rank-3 codebook used for $W_2$.

When $$W_1 = \begin{bmatrix} X^{(k)} & 0 \\ 0 & X^{(k)} \end{bmatrix} (k=0),$$

then $$W_2 \in CB_2 = \left\{ \frac{1}{\sqrt{2}} \begin{bmatrix} Y_1 & Y_2 \\ Y_1 & -Y_2 \end{bmatrix} \right\}$$

$$(Y_1, Y_2) \in \left\{ \begin{array}{l} (e_1^4, [e_1^4, e_3^4]), (e_2^4, [e_2^4, e_4^4]), (e_3^4, [e_1^4, e_3^4]), (e_4^4, [e_2^4, e_4^4]), \\ ([e_1^4, e_3^4], e_1^4), ([e_2^4, e_4^4], e_2^4), ([e_1^4, e_3^4], e_3^4), ([e_2^4, e_4^4], e_4^4) \end{array} \right\},$$

corresponding to $i_2 = 0, \ldots, 7$.

To make the $W_2$ overhead consistent for different $W_1$ matrices, $i_2 = 8, \ldots, 15$ shall be reserved for $W_2$ corresponding to $W_1$ matrices that are enhancement components (e.g. block diagonal).

Alternatively, when $$W_1 = \begin{bmatrix} X^{(k)} & 0 \\ 0 & X^{(k)} \end{bmatrix} (k=0),$$

then $$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$$(Y_1, Y_2) \in \left\{ \begin{array}{l} (e_1^4, [e_1^4, e_3^4]), (e_2^4, [e_2^4, e_4^4]), (e_3^4, [e_1^4, e_3^4]), (e_4^4, [e_2^4, e_4^4]), \\ ([e_1^4, e_3^4], e_1^4), ([e_2^4, e_4^4], e_2^4), ([e_1^4, e_3^4], e_3^4), ([e_2^4, e_4^4], e_4^4) \end{array} \right\}.$$

In this case W2 overhead is 4-bits per sub-band

The rank-3 PMI overhead for this example is shown in Table 4.

TABLE 4

|  | W1 overhead (wideband) | W2 overhead (subband) |
|---|---|---|
| Rank-3 | 0-bit (w/o augmentation) 1-bit (w/augmentation) | 4-bit |

It is possible that the Release 12 4Tx codebook does not comprise of the Release 8 codebook. In that case, the identity matrix is removed from the $W_1$ codebook $C_1$.

Note that in any of the $(Y_1, Y_2)$ pairs above, the two selection vectors inside the brackets can be permuted. For example, $(e_1^4, [e_1^4, e_3^4])$ can be replaced by $(e_1^4, [e_3^4, e_1^4])$, and the resulting codebook is equivalently applicable.

It is not precluded that the Release 12 4Tx rank-3 codebook is redesigned using the GoB component as proposed above, and not include any Release 8 4Tx rank-3 precoding matrices.

Another alternative GoB design is (N,Nb)=(8,8), where $$W_1 = \begin{bmatrix} X^{(k)} & 0 \\ 0 & X^{(k)} \end{bmatrix} (k=0), \text{ and}$$

$$W_2 \in CB_2 = \left\{ \frac{1}{\sqrt{2}} \begin{bmatrix} Y_1 & Y_2 \\ Y_1 & -Y_2 \end{bmatrix} \right\}, \text{ or}$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}$$

-continued $$(Y_1, Y_2) \in \begin{Bmatrix} (e_1^4, [e_1^4, e_5^4]), (e_2^4, [e_2^4, e_6^4]), (e_3^4, [e_3^4, e_7^4]), (e_4^4, [e_4^4, e_8^4]), \\ (e_5^4, [e_1^4, e_5^4]), (e_6^4, [e_2^4, e_6^4]), (e_7^4, [e_3^4, e_7^4]), (e_8^4, [e_4^4, e_8^4]), \\ ([e_1^4, e_5^4], e_1^4), ([e_2^4, e_6^4], e_2^4), ([e_3^4, e_7^4], e_3^4), ([e_4^4, e_8^4], e_4^4), \\ ([e_1^4, e_5^4], e_5^4), ([e_2^4, e_6^4], e_6^4), ([e_3^4, e_7^4], e_7^4), ([e_4^4, e_8^4], e_8^4), \end{Bmatrix}$$

Rank 4:

The simplest solution is to reuse Release 8 codebook as-is for Release 12.

$$W_1 = I_4 \quad (18)$$

→Size-1 (Rel-8 codebook only).

$$W_2 \in C_{2,R8Tx4r4},$$

where $C_{2,R8Tx4r4}$ denotes the Release 8 4Tx rank-4 codebook used for $W_2$.

If enhancement based on (N,Nb) structure is warranted by sufficient performance gain, it can be done in a similar fashion as for rank-1 and rank-2. For instance, based on a (N,Nb)=(4,4) design, $$W_1 \in C_1 = \left\{ I_4, \begin{bmatrix} X^{(0)} & 0 \\ 0 & X^{(0)} \end{bmatrix} \right\} \quad (19)$$

→Size-2 (Rel-8 codebook augmented with block diagonal GoB)

When $W_1 = I_4$, then $W_2 \in C_{2,R8Tx4r4}$, where $C_{2,R8Tx4r4}$ denotes the Release 8 4Tx rank-4 codebook used for $W_2$.

When $$W_1 = \begin{bmatrix} X^{(k)} & 0 \\ 0 & X^{(k)} \end{bmatrix} (k = 0),$$

then $$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

where $$(Y_1, Y_2) \in \left\{ \begin{matrix} ([e_1^4\ e_3^4], [e_1^4, e_3^4]), ([e_2^4, e_4^4], [e_2^4, e_4^4]), \\ ([e_1^4\ e_3^4], [e_2^4, e_4^4]), ([e_2^4, e_4^4], [e_1^4, e_3^4]) \end{matrix} \right\},$$

corresponding to $i_1 = 0, \ldots, 7$.

Note there are a total of 8 $W_2$ matrices ($i_2 = 0, \ldots, 7$) for $$W_1 = \begin{bmatrix} X^{(k)} & 0 \\ 0 & X^{(k)} \end{bmatrix}$$

To make the $W_2$ overhead consistent across all $W_1$, $W_2$ can be reserved for $i_2 = 8, \ldots, 15$.

Alternatively, one may adopt a (N, Nb)=(8,8) codebook as below:

$$W_1 \in C_1 = \left\{ I_4, \begin{bmatrix} X^{(0)} & 0 \\ 0 & X^{(0)} \end{bmatrix} \right\} \quad (20)$$

→Size-2 (Rel-8 codebook augmented with block diagonal GoB)

When $W_1 = I_4$, then $W_2 \in C_{2,R8Tx4r4}$, where $C_{2,R8Tx4r4}$ denotes the Release 8 4Tx rank-4 codebook used for $W_2$.

When $$W_1 = \begin{bmatrix} X^{(k)} & 0 \\ 0 & X^{(k)} \end{bmatrix} (k = 0),$$

then $$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \text{ and}$$

$$(Y_1, Y_2) \in \left\{ \begin{matrix} ([e_1^8\ e_5^8], [e_1^8, e_5^8]), ([e_2^8, e_6^8], [e_2^8, e_6^8]), ([e_3^8, e_7^8], [e_3^8, e_7^8]), ([e_4^8, e_8^8], [e_4^8, e_8^8]), \\ ([e_1^8\ e_5^8], [e_2^8, e_6^8]), ([e_1^8, e_5^8], [e_3^8, e_7^8]), ([e_2^8, e_6^8], [e_4^8, e_8^8]), ([e_3^8, e_7^8], [e_4^8, e_8^8]) \end{matrix} \right\}.$$

Note that in any of the $(Y_1, Y_2)$ pair above, the two selection vectors inside the brackets [ ] can be permuted.

Also note that any $(Y_1, Y_2)$ pair above can be replaced by a different pair denoted as $([e_m^{N_b}, e_{m+N/2}^{N_b}], [e_n^{N_b}, e_{n+N/2}^{N_b}])$, where $1 \leq m \leq N/2$, $1 \leq n \leq N/2$.

The rank-4 PMI overhead for this example is shown in Table 5.

TABLE 5

| | W1 overhead (wideband) | W2 overhead (sub-band) |
|---|---|---|
| Rank-4 | 0-bit (w/o augmentation) 1-bit (w/augmentation) | 4-bit |

It is possible that the Release 12 4Tx codebook does not comprise of the Release 8 codebook. In that case, the identity matrix is removed from the $W_1$ codebook $C_1$.

It is not precluded that the Release 12 4Tx rank-4 codebook is redesigned using the GoB component as proposed above, and not includes any Release 8 4Tx rank-4 precoding matrices.

The final 4Tx codebook comprises of rank-r codebook, r=1, 2, 3, 4. For each rank r, the corresponding rank-r codebook can be constructed by methods discussed above regarding rank-1 to rank-4 codebooks. It is not precluded that codebook is enhanced for certain rank(s), while for the other ranks, Release 8 codebook is reused.

Reformulation of Proposed Rank-1 to Rank-4 Codebooks

Using (N, Nb)=(16,4) as an example, the proposed codebook in the sections above may be re-formulated by the equations shown in the tables below. It should be noted that these tables can be easily extended to other (N, Nb) values.

Rank 1-2

If Release 12 4Tx codebook for rank-1 and rank-2 is redesigned by the GoB framework with adjacent beams overlapping, and does not include the Release 8 codebook, the 4Tx codebooks can be expressed by equations in Tables 6-1 and 6-2.

A first PMI value of $n_1 \in \{0, 1, \ldots, f(\upsilon)-1\}$ and a second PMI value of $n_2 \in \{0, 1, \ldots, g(\upsilon)-1\}$ correspond to the codebook indices $n_1$ and $n_2$ given in Table. 6-j, where $\upsilon$ is equal to the associated rank value and where $j=\upsilon$, $f(\upsilon)=\{8,8\}$ and $g(\upsilon)=\{16,16\}$. Interchangeably, the first and second precoding matrix indicators are expressed by $i_1$ and $i_2$.

The quantities $\varphi_n$ and $v_m$ are expressed by $$\varphi_n = e^{j\pi n/2} \quad (21)$$

$$v_m = [1;\ e^{j2\pi m/16}] \quad (22)$$

Table 6-1 illustrates a codebook for 1-layer CSI reporting according to one embodiment.

TABLE 6-1

| $i_1$ | $i_2$ | | | | | | | |
|---|---|---|---|---|---|---|---|---|
| | 0 | 1 | 2 | 3 | 4 | 5 | 6 | 7 |
| 0-7 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| $i_1$ | $i_2$ | | | | | | | |
| | 8 | 9 | 10 | 11 | 12 | 13 | 14 | 15 |
| 0-7 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \dfrac{1}{\sqrt{4}} \begin{bmatrix} v_m \\ \varphi_n v_m \end{bmatrix}$ Table 6-2 illustrates a codebook for 2-layer CSI reporting according to one embodiment.

TABLE 6-2

| $i_1$ | $i_2$ | | | |
|---|---|---|---|---|
| | 0 | 1 | 2 | 3 |
| 0-7 | $W^{(2)}_{2i_1,2i_1,0}$ | $W^{(2)}_{2i_1,2i_1,1}$ | $W^{(2)}_{2i_1,1,2i_1+1,0}$ | $W^{(2)}_{2i_1+1,2i_1+1,1}$ |
| $i_1$ | $i_2$ | | | |
| | 4 | 5 | 6 | 7 |
| 0-7 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |
| $i_1$ | $i_2$ | | | |
| | 8 | 9 | 10 | 11 |
| 0-7 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |
| $i_1$ | $i_2$ | | | |
| | 12 | 13 | 14 | 15 |
| 0-7 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $W^{(2)}_{m,m',n} = \dfrac{1}{\sqrt{8}} \begin{bmatrix} v_m & v_{m'} \\ \varphi_n v_m & -\varphi_n v_{m'} \end{bmatrix}$ If the Release 12 4Tx codebook for rank-1 and rank-2 is designed by augmenting the existing Release 8 codebook with GoB components, then the Release 12 4Tx codebook can be expressed as in Table 6-3 and Table 6-4.

Table 6-3 illustrates a codebook for 1-layer CSI reporting according to one embodiment.

TABLE 6-3

| $i_1$ | $i_2$ | | | | | | | | | | | | | | | |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| | Use precoding matrix of index $i_2$ of Release 8 4Tx rank-1 codebook | | | | | | | | | | | | | | | |
| $i_1$ | $i_2$ | | | | | | | | | | | | | | | |
| 1-8 | 0 | 1 | 2 | 3 | 4 | 5 | 6 | 7 | 8 | 9 | 10 | 11 | 12 | 13 | 14 | 15 |
| | Corresponding to $i_1 = 0$-7 in table 6-1 | | | | | | | | | | | | | | | |

Table 6-4 illustrates a codebook for 2-layer CSI reporting according to one embodiment.

TABLE 6-4

| $i_1$ | $i_2$ | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | Use precoding matrix of index $i_2$ of Release 8 4Tx rank-1 codebook | | | | | | | | | | | | | | | |
| $i_1$ | $i_2$ | | | | | | | | | | | | | | | |
| | 0 | 1 | 2 | 3 | 4 | 5 | 6 | 7 | 8 | 9 | 10 | 11 | 12 | 13 | 14 | 15 |
| 1-8 | Corresponding to $i_1 = 0$-7 in table 6-2 | | | | | | | | | | | | | | | |

Rank 3-4

If the Release 12 4Tx codebook for rank-3 and rank-3 is redesigned by the GoB framework with adjacent beams overlapping, and not includes the Release 8 codebook, the 4Tx codebooks can be expressed by equations in Table 6-5 and 6-6.

Table 6-5 illustrates a codebook for 3-layer CSI reporting according to one embodiment.

TABLE 6-5

| $i_1$ | $i_2$ | | | |
|---|---|---|---|---|
| | 0 | 1 | 2 | 3 |
| | $W^{(3)}_{16i_1,16i_1,16i_1+8,0}$ | $W^{(3)}_{16i_1,16i_1,16i_1+8,1}$ | $W^{(3)}_{16i_1+4,16i_1+4,16i_1+12,0}$ | $W^{(3)}_{16i_1+4,16i_1+4,16i_1+12,1}$ |
| $i_1$ | 4 | 5 | 6 | 7 |
| | $W^{(3)}_{16i_1+8,16i_1,16i_1+8,0}$ | $W^{(3)}_{16i_1+8,16i_1,16i_1+8,1}$ | $W^{(3)}_{16i+12,16i_1+4,16i_1+12,0}$ | $W^{(3)}_{16i_1+12,16i_1+4,16i_1+12,1}$ |
| $i_1$ | 8 | 9 | 10 | 11 |
| | $\tilde{W}^{(3)}_{16i_1,16i_1+8,16i_1,0}$ | $\tilde{W}^{(3)}_{16i_1,16i_1+8,16i_1,1}$ | $\tilde{W}^{(3)}_{16i_1+4,16i_1+12,16i_1+4,0}$ | $\tilde{W}^{(3)}_{16i_1+4,16i_1+12,16i_1+4,1}$ |
| $i_1$ | 12 | 13 | 14 | 15 |
| | $\tilde{W}^{(3)}_{16i_1,16i_1+8,16i_1+8,0}$ | $\tilde{W}^{(3)}_{16i_1,16i_1+8,16i_1+8,1}$ | $\tilde{W}^{(3)}_{16i_1+4,16i_1+12,16i_1+12,0}$ | $\tilde{W}^{(3)}_{16i_1+4,16i_1+12,16i_1+12,1}$ |
| where | $W^{(3)}_{m,m',m'',n} = \frac{1}{\sqrt{12}} \begin{bmatrix} v_m & v_{m'} & v_{m''} \\ \varphi_n v_m & -\varphi_n v_{m'} & -\varphi_n v_{m''} \end{bmatrix}$, $\tilde{W}^{(3)}_{m,m',m'',n} = \frac{1}{\sqrt{12}} \begin{bmatrix} v_m & v_{m'} & v_{m''} \\ \varphi_n v_m & \varphi_n v_{m'} & -\varphi_n v_{m''} \end{bmatrix}$ | | | |

Table 6-6 illustrates a codebook for 4-layer CSI reporting according to one embodiment.

TABLE 6-6

| $i_1$ | $i_2$ | | | |
|---|---|---|---|---|
| | 0 | 1 | 2 | 3 |
| 0 | $W^{(4)}_{16i_1,16i_1+8,16i_1,16i_1+8,0}$ | $W^{(4)}_{16i_1,16i_1+8,16i_1,16i_1+8,1}$ | $W^{(4)}_{16i_1+4,16i_1+12,16i_1+4,16i_1+12,0}$ | $W^{(4)}_{16i_1+4,16i_1+12,16i_1+4,16i_1+12,1}$ |
| $i_1$ | 4 | 5 | 6 | 7 |
| 0 | $W^{(4)}_{16i_1,16i_1+8,16i_1+4,16i_1+12,0}$ | $W^{(4)}_{16i_1,16i_1+8,16i_1+4,16i_1+12,1}$ | $W^{(4)}_{16i_1+4,16i_1+12,16i_1,16i_1+8,0}$ | $W^{(4)}_{16i_1+4,16i_1+12,16i_1,16i_1+8,0}$ |
| where | $W^{(4)}_{m,m',m'',m''',n} = \frac{1}{\sqrt{16}} \begin{bmatrix} v_m & v_{m'} & v_{m''} & v_{m'''} \\ \varphi_n v_m & \varphi_n v_{m'} & -\varphi_n v_{m''} & -\varphi_n v_{m'''} \end{bmatrix}$ | | | |

If the Release 12 4Tx codebook for rank-3 and rank-3 is designed by augmenting the existing Release 8 codebook with GoB components, the Release 12 4Tx codebook can be expressed as in Table 6-7 and Table 6-8.

Table 6-7 illustrates a codebook for 3-layer CSI reporting according to one embodiment.

TABLE 6-7

| $i_1$ | | | | | | | | $i_2$ | | | | | | | |
|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| | Use precoding matrix of index $i_2$ of Release 8 4Tx rank-3 codebook | | | | | | | | | | | | | | |
| $i_1$ | | | | | | | | $i_2$ | | | | | | | |
| 1-8 | 0 | 1 | 2 | 3 | 4 | 5 | 6 | 7 | 8 | 9 | 10 | 11 | 12 | 13 | 14 | 15 |
| | | | | Corresponding to $i_1 = 0\text{-}7$ in Table 6-5. | | | | | | | | | | | |

Table 6-8 illustrates a codebook for 4-layer CSI reporting according to one embodiment.

TABLE 6-8

| $i_1$ | | | | | | | | $i_2$ | | | | | | | |
|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| | Use precoding matrix of index $i_2$ of Release 8 4Tx rank-4 codebook | | | | | | | | | | | | | | |
| $i_1$ | | | | | | | | $i_2$ | | | | | | | |
| 1-8 | 0 | 1 | 2 | 3 | 4 | 5 | 6 | 7 | 8 | 9 | 10 | 11 | 12 | 13 | 14 | 15 |
| | For $i_2 = 0\text{-}7$: corresponding to $i_1 = 0\text{-}7$ in Table 6-6. | | | | | | | | | | | | | | |
| | For $i_2 = 8\text{-}15$: reserved. | | | | | | | | | | | | | | |

Alternative Codebook Designs

For the $W_1$ codebook $C_1$ proposed above, the GoB component is expressed in the form of a block diagonal matrix as $$W_1 \in C_1 = \left\{ \begin{bmatrix} X^{(k)} & 0 \\ 0 & X^{(k)} \end{bmatrix} \right\} \quad (23)$$

where without overlapping:

$$X^{(k)} \in \left\{ \begin{bmatrix} b_{(N_b k) \bmod N} & b_{(N_b k+1) \bmod N} & \cdots & b_{(N_b k+N_b-1) \bmod N} \end{bmatrix} : k = 0, \right. \quad (24)$$
$$\left. 1, \ldots, \frac{N}{N_b} - 1 \right\},$$

and with overlapping:

$$X^{(k)} \in \left\{ \begin{bmatrix} b_{(N_b k/2) \bmod N} & b_{(N_b k/2+1) \bmod N} & \cdots & b_{(N_b k/2+N_b-1) \bmod N} \end{bmatrix} : k = 0, \right. \quad (25)$$
$$\left. 1, \ldots, \frac{2N}{N_b} - 1 \right\}.$$

Each $X^{(k)}$ represents a group of Nb adjacent beams that model a certain angle of arrival and angular spread.

Alternative designs are possible where the block diagonal sub-matrix of $W_1$ (i.e. $x^{(k)}$) is replaced by linear or non-linear transformations of $x^{(k)}$, for example:

$$W_1(n, m, k) \in C_1 = \left\{ \begin{bmatrix} f_n(X^{(k)}) & 0 \\ 0 & g_m(X^{(k)}) \end{bmatrix}, k = 0, \ldots \right\}, \quad (26)$$

where $f_n(\ )$, $g_m(\ )$, $n=0, \ldots, m=0, \ldots$ are linear/non-linear transformation functions.

In the following section several such possible designs are described assuming (N,Nb)=(16,4) as an example, but extension to other (N, Nb) values are straightforward.

It is also assumed that the Release 12 4Tx codebook is redesigned using the GoB structure and does not include the Release 8 4Tx codebook; however it is straightforward to augment the Release 8 4Tx codebook by the designs proposed below.

Example 1: Beam Shifting

In one embodiment, $$W_1(n, m, k) \in C_1 = \quad (27)$$
$$\left\{ \begin{bmatrix} f_n(X^{(k)}) & 0 \\ 0 & g_m(X^{(k)}) \end{bmatrix}, k = 0, \ldots \right\} = \begin{bmatrix} X^{(k)} & 0 \\ 0 & D(m)X^{(k)} \end{bmatrix}.$$

Alternatively, $$C_1 = \begin{bmatrix} D(m)X^{(k)} & 0 \\ 0 & X^{(k)} \end{bmatrix}. \quad (28)$$

$D(m)$ ($m=0, 1 \ldots N-1$) is a $Nt/2 \times Nt/2$ diagonal matrix, in the case of $Nt=4$ denoted as $$D = \begin{bmatrix} 1 & 0 \\ 0 & e^{j\frac{2\pi m}{N}} \end{bmatrix}. \quad (29)$$

Herein $D(m)$ performs beam shifting. For instance, as the first sub-matrix $x^{(k)}$ comprises of Nb adjacent beams $b_{(N_b k) \bmod N}$ $b_{(N_b k+1) \bmod N}$ $\cdots$ $b_{(N_b k+N_b-1) \bmod N}$, the second sub-matrix $D(m)X^{(k)}$ comprises a different grid of Nb beams as $b_{(N_b k+m) \bmod N}$ $b_{(N_b k+1+m) \bmod N}$ $\cdots$ $b_{(N_b k+N_b-1+m) \bmod N}$.

In other words, the second grid of beam is shifted by m beams, where m can take values from 0 to N−1. If m=0, ... N−1, the $W_1$ codebook size is increased to $$N\frac{N}{N_b}$$

without $W_1$ overlapping, and $$N\frac{2N}{N_b}$$

with $W_1$ overlapping. Note that the codebook proposed in the initial sections above is a special case where m=0, in which case there is no beam shifting.

Figure 4:
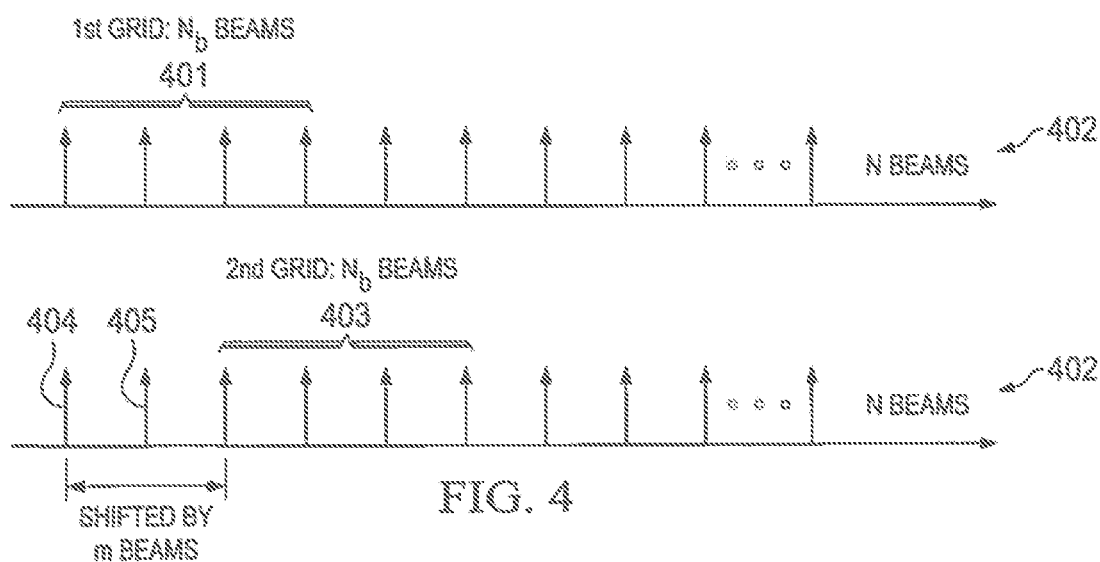
FIG. 4 illustrates an example in which a grid of beams is shifted by m=2 beams.

FIG. 4 illustrates an example in which a grid of beams is shifted by m=2 beams. A first grid of Nb beams 401 is selected from N beams 402. The second grid of beams 403 is selected from the N beams 402, but is shifted by two beams 404, 405 relative to the first grid of beams 401.

It is not precluded that a subset of D(m) matrices are used in constructing codebook $C_1$, where m∈Π, Π⊆{0, ... N−1}. For instance, when Π={1}, the Nb beams in the second grid of beams (e.g., for the vertical polarization array 402) are all shifted by 1 beam, which is half of the number of overlapping beams (Nb/2=2) between two consecutive $W_1$ matrices. As another example, when Π={0,1}, the second grid of Nb beams may be unshifted, or shifted by one beam.

In another embodiment, both the first and second grid of beams may be shifted. This is expressed as:

$$W_1(n, m, k) \in C_1 = \qquad (30)$$

$$\left\{ \begin{bmatrix} f_n(X^{(k)}) & 0 \\ 0 & g_m(X^{(k)}) \end{bmatrix}, k = 0, \dots \right\} = \begin{bmatrix} G(n)X^{(k)} & 0 \\ 0 & D(m)X^{(k)} \end{bmatrix},$$

where $G(n) = \begin{bmatrix} 1 & 0 \\ 0 & e^{j\frac{2\pi n}{N}} \end{bmatrix}$, $(n = 0, 1 \dots N-1)$, $$D(m) = \begin{bmatrix} 1 & 0 \\ 0 & e^{j\frac{2\pi m}{N}} \end{bmatrix}, (m = 0, 1 \dots N-1).$$

Similarly, it is possible to use a subset of G(n) and D(m) matrices in generating the codebook $C_1$.

Example 2: Beam Permutation

It is further possible to permute the selected beams in one or both sub-matrices of $W_1$. As one example, the $W_1$ codebook is expressed as:

$$W_1(l, m, k) \in C_1 = \left\{ \begin{bmatrix} X^{(k)} & 0 \\ 0 & D(m)X^{(k)}P(l) \end{bmatrix} \right\}, \qquad (31)$$

where P(l) is a 4×4 column permutation of an $N_b \times N_b$ identity matrix $I_{N_b}$.

One example of P(l) is $$P(l) = \begin{bmatrix} 0 & 1 & 0 & 0 \\ 1 & 0 & 0 & 0 \\ 0 & 0 & 1 & 0 \\ 0 & 0 & 0 & 1 \end{bmatrix}.$$

By multiplying P(l) to $D(m)X^{(k)}$, the Nb beams in the second sub-matrix $D(m)X^{(k)}$ are permuted before being co-phased with the first grid of beam $X^{(k)}$, providing further diversity gain in the $W_1$ codebook.

Permutation can be performed for both sub-matrices of $W_1$. In another example, the $W_1$ codebook is expressed as $$W_1(j, l, n, m, k) \in C_1 = \left\{ \begin{bmatrix} f_n(X^{(k)})P_1(j) & 0 \\ 0 & g_m(X^{(k)})P_2(l) \end{bmatrix}, \right. \qquad (32)$$

$$\left. k = 0, \dots \right\} = \begin{bmatrix} D(n)X^{(k)}P_1(j) & 0 \\ 0 & D(m)X^{(k)}P_2(l) \end{bmatrix}$$

where $P_1(j)$ and $P_2(l)$ perform column permutations for the first and the second grid of beams, respectively.

Note that the permutation operation P(l) can be applied without beam shifting (e.g. D(m)).

Example 3: Phase Rotation

In another embodiment, $$W_1(n, m, k) \in C_1 = \qquad (33)$$

$$\left\{ \begin{bmatrix} f_n(X^{(k)}) & 0 \\ 0 & g_m(X^{(k)}) \end{bmatrix}, k = 0, \dots \right\} = \begin{bmatrix} X^{(k)} & 0 \\ 0 & X^{(k)}D(m) \end{bmatrix}$$

Alternatively, $$C_1 = \begin{bmatrix} X^{(k)}D(m) & 0 \\ 0 & X^{(k)} \end{bmatrix} \qquad (34)$$

D(m) (m=0, 1 . . . N−1) is a Nb×Nb diagonal matrix denoted as $$D = \begin{bmatrix} 1 & 0 & 0 & 0 \\ 0 & e^{j\frac{2\pi m}{N}} & 0 & 0 \\ 0 & 0 & \dots & \\ 0 & 0 & 0 & e^{j\frac{2\pi(N_b-1)m}{N}} \end{bmatrix}. \qquad (35)$$

Herein D(m) performs phase correction to the Nb beams. For instance, as the first sub-matrix $X^{(k)}$ comprises Nb adjacent beams defined as:

$$b_{(N_b k) \bmod N} \, b_{(N_b k+1) \bmod N} \cdots b_{(N_b k+N_b-1) \bmod N},$$

the second sub-matrix $D(m)X^{(k)}$ comprises a different grid of Nb beams defined as $$b_{(N_b k+m) \bmod N} \, e^{j\frac{2\pi m}{N}} b_{(N_b k+m) \bmod N} \cdots e^{j\frac{2\pi(N_b-1)m}{N}} b_{(N_b k+N_b-1) \bmod N}.$$

In other words, the m-th beam in the second grid (m=0, 1, . . . , Nb-1) is phase rotated by $$\frac{2\pi(N_b-1)m}{N}$$

degrees.

It is also possible to apply the phase rotation to both the first and the second grid of beams.

An alternative formulation of the phase rotation matrix D(m) is given as $$D = \begin{bmatrix} 1 & 0 & 0 & 0 \\ 0 & e^{j\frac{\pi}{2N_b}} & 0 & 0 \\ 0 & 0 & \ldots & \\ 0 & 0 & 0 & e^{j\frac{(N_b-1)\pi}{2N_b}} \end{bmatrix} \quad (36)$$

where Nb phase correction components $$\left(e.g., 1, e^{j\frac{\pi}{2N_b}}, \ldots e^{j\frac{(N_b-1)\pi}{2N_b}}\right)$$

uniformly sample a 90-degree sector. As such, co-phasing between two grids of beams is no longer limited to the QPSK alphabet as in the W2 codebook, but can take values of $$\left\{0, \frac{\pi}{2N_b}, \ldots \frac{(N_b-1)\pi}{2N_b}\right\} + \{0, \pi/2, \pi,, 3\pi/2,\}.$$

It will be further understood that combination of beam shifting, beam permutation, and/or phase rotation schemes can be used in constructing the $W_1$ codebook.

Pruning the 8Tx Codebook for 4Tx MIMO

The LTE Release 10 8Tx codebook is designed using the GoB structure. Specifically:

- each 4Tx polarization array is over-sampled by N DFT beams'
- each wideband $W_1$ matrix comprises Nb adjacent DFT beams to cover a certain AoD and angular spread, and
- narrowband $W_2$ performs beam selection and co-phasing.

As such, the 4Tx GoB codebook components can be selected as sub-matrices of a subset of the 8Tx codebook in Release 12. In other words, each 4Tx GoB precoder may correspond to four selected rows of a Release 10 8Tx precoder (i.e., pruning the 8Tx codebook down to four rows).

To illustrate this pruning, the Release 10 8Tx codebook is denoted as $$C^{(8)} = C_1^{(8)} \times C_2^{(8)},$$

where $C^{(8)} = \{W^{(8)}\}$, $C_1^{(8)} = \{W_1^{(8)}\}$ and $C_2^{(8)} = \{W_2^{(8)}\}$ are the first and second codebook.

Subsequently, the 4Tx GoB codebook can be written as $$C^{(4)} = \{W^{(4)}\} = C_1^{(4)} \times C_2^{(4)}, \quad (37)$$

where $C^{(4)} = \{W^{(4)}\} \subseteq \{W^{(8)}_{[(n1,n2,ne,n4),:]}\}$, and where, for an 8×R matrix H, $H_{(n_i,:)}$ denotes the ni-th row of H, $$H_{[(n1,n2,n3,n4),:]} = \begin{pmatrix} H_{(n1,:)} \\ H_{(n2,:)} \\ H_{(n3,:)} \\ H_{(n4,:)} \end{pmatrix},$$

and $(n1,n2,n3,n4)$ is the row selection vector for codebook pruning.

The 4Tx GoB codebooks proposed above may be pruned from the Release 10 8Tx codebook. The following notations are used herein:

$i_1^4$: index of first precoder $W_1$ for 4Tx
$i_2^4$ index of second precoder $W_2$ for 4Tx
$i_1^8$ index of first precoder $W_1$ for 8Tx
$i_2^8$ index of second precoder $W_1$ for 8Tx As such, each 8Tx precoding matrix $W^{(8)} = W_1^{(8)} W_2^{(8)}$ is denoted by a pair of 8Tx codebook indices ($i_1^8$, $i_2^8$), and each 4Tx precoding matrix $W^{(4)} = W_1^{(4)} W_2^{(4)}$ is denoted by a pair of 4Tx codebook indices ($i_1^4$, $i_2^4$), Rank-1

For a (N,Nb)=(N,Nb) 4Tx GoB codebook with overlapping beams, where N<=32, Nb=4, each 4Tx precoding matrix denoted by ($i_1^4$, $i_2^4$) can be pruned from a corresponding 8Tx rank-1 precoding matrix denoted by ($i_1^8$, $i_2^8$), where $$i_1^4 = \frac{32}{N} i_1^8,$$

$$i_2^4 = i_2^8, i_2^4 = 0, \ldots, 15$$

More specifically:

For (N,Nb)=(8,4) 4Tx codebook with overlapping, each 4Tx precoding matrix denoted by a pair of 4Tx codebook indices ($i_1^4$, $i_2^4$) can be pruned from a corresponding 8Tx rank-1 precoding matrix denoted by a pair of 8Tx codebook indices ($i_1^8$, $i_2^8$), as given in Table 7.

TABLE 7

| 4Tx indices | $i_1^4$ | | | | $i_2^4$ | | | |
|---|---|---|---|---|---|---|---|---|
| | 0-3 | 0 | 1 | 2 | 3 | 4 | 5 | 6 | 7 |
| Corresponding 8Tx indices | $i_1^8$ $4i_1^4$ | 0 | 1 | 2 | $i_2^8$ 3 | 4 | 5 | 6 | 7 |
| 4Tx indices | $i_1^4$ 0-3 | 8 | 9 | 10 | $i_2^4$ 11 | 12 | 13 | 14 | 15 |
| Corresponding 8Tx indices | $i_1^8$ $4i_1^4$ | 8 | 9 | 10 | $i_2^8$ 11 | 12 | 13 | 14 | 15 |

For a (N,Nb)=(16,4) 4Tx codebook with overlapping beams, each 4Tx precoding matrix denoted by ($i_1^4$, $i_2^4$) can be pruned from a corresponding 8Tx rank-1 precoding matrix denoted by ($i_1^8$, $i_2^8$), as given in Table 8.

TABLE 8

| 4Tx indices | $i_1^4$ | | | | $i_2^4$ | | | |
|---|---|---|---|---|---|---|---|---|
| | 0-7 | 0 | 1 | 2 | 3 | 4 | 5 | 6 | 7 |
| Corresponding 8Tx indices | $i_1^8$ $2i_1^4$ | 0 | 1 | 2 | $i_2^8$ 3 | 4 | 5 | 6 | 7 |
| 4Tx indices | $i_1^4$ 0-7 | 8 | 9 | 10 | $i_2^4$ 11 | 12 | 13 | 14 | 15 |
| Corresponding 8Tx indices | $i_1^8$ $2i_1^4$ | 8 | 9 | 10 | $i_2^8$ 11 | 12 | 13 | 14 | 15 |

For (N,Nb)=(32,4) 4Tx codebook with overlapping beams, each 4Tx precoding matrix denoted by ($i_1^4$, $i_2^4$) can be pruned from a corresponding 8Tx rank-1 precoding matrix denoted by $(i_1^8, i_2^8)$, as given in Table 9.

TABLE 9

| 4Tx indices | $i_1^4$ 0-15 | 0 | 1 | 2 | $i_2^4$ 3 | 4 | 5 | 6 | 7 |
|---|---|---|---|---|---|---|---|---|---|
| Corresponding 8Tx indices | $i_1^8$ $i_1^4$ | 0 | 1 | 2 | $i_2^8$ 3 | 4 | 5 | 6 | 7 |
| 4Tx indices | $i_1^4$ 0-15 | 8 | 9 | 10 | $i_2^4$ 11 | 12 | 13 | 14 | 15 |
| Corresponding 8Tx indices | $i_1^8$ $i_1^4$ | 8 | 9 | 10 | $i_2^8$ 11 | 12 | 13 | 14 | 15 |

For a (N,Nb)=(N,Nb) 4Tx codebook without overlapping beams, where N<=32, and Nb=4, each 4Tx precoding matrix denoted by a pair of 4Tx codebook indices $(i_1^4, i_2^4)$ can be pruned from a corresponding 8Tx rank-1 precoding matrix denoted by a pair of 8Tx codebook indices $(i_1^8, i_2^8)$, where $$i_1^4 = \frac{64}{N} i_1^8,$$

$$i_2^4 = i_2^8, i_2^4 = 0, \ldots, 15.$$

More specifically:

For a (N,Nb)=(8,4) 4Tx codebook without overlapping beams, each 4Tx precoding matrix denoted by $(i_1^4, i_2^4)$ can be pruned from a corresponding 8Tx rank-1 precoding matrix denoted by $(i_1^8, i_2^8)$, as given in Table 10.

TABLE 10

| 4Tx indices | $i_1^4$ 0-1 | 0 | 1 | 2 | $i_2^4$ 3 | 4 | 5 | 6 | 7 |
|---|---|---|---|---|---|---|---|---|---|
| Corresponding 8Tx indices | $i_1^8$ $8i_1^4$ | 0 | 1 | 2 | $i_2^8$ 3 | 4 | 5 | 6 | 7 |
| 4Tx indices | $i_1^4$ 0-1 | 8 | 9 | 10 | $i_2^4$ 11 | 12 | 13 | 14 | 15 |
| Corresponding 8Tx indices | $i_1^8$ $8i_1^4$ | 8 | 9 | 10 | $i_2^8$ 11 | 12 | 13 | 14 | 15 |

For a (N,Nb)=(16,4) 4Tx codebook without overlapping beams, each 4Tx precoding matrix denoted by $(i_1^4, i_2^4)$ can be pruned from a corresponding 8Tx rank-1 precoding matrix denoted by $(i_1^8, i_2^8)$, as given in Table 11.

TABLE 11

| 4Tx indices | $i_1^4$ 0-3 | 0 | 1 | 2 | $i_2^4$ 3 | 4 | 5 | 6 | 7 |
|---|---|---|---|---|---|---|---|---|---|
| Corresponding 8Tx indices | $i_1^8$ $4i_1^4$ | 0 | 1 | 2 | $i_2^8$ 3 | 4 | 5 | 6 | 7 |
| 4Tx indices | $i_1^4$ 0-3 | 8 | 9 | 10 | $i_2^4$ 11 | 12 | 13 | 14 | 15 |
| Corresponding 8Tx indices | $i_1^8$ $4i_1^4$ | 8 | 9 | 10 | $i_2^8$ 11 | 12 | 13 | 14 | 15. |

For a (N,Nb)=(32,4) 4Tx codebook without overlapping beams, each 4Tx precoding matrix denoted by $(i_1^4, i_2^4)$ can be pruned from a corresponding 8Tx rank-1 precoding matrix denoted by $(i_1^8, i_2^8)$, as given in Table 12.

TABLE 12

| 4Tx indices | $i_1^4$ 0-7 | 0 | 1 | 2 | $i_2^4$ 3 | 4 | 5 | 6 | 7 |
|---|---|---|---|---|---|---|---|---|---|
| Corresponding 8Tx indices | $i_1^8$ $2i_1^4$ | 0 | 1 | 2 | $i_2^8$ 3 | 4 | 5 | 6 | 7 |
| 4Tx indices | $i_1^4$ 0-7 | 8 | 9 | 10 | $i_2^4$ 11 | 12 | 13 | 14 | 15 |

TABLE 12-continued

| Corresponding 8Tx indices | $i_1^8$ $2i_1^4$ | 8 | 9 | 10 | $i_2^8$ 11 | 12 | 13 | 14 | 15 |
|---|---|---|---|---|---|---|---|---|---|

Rank-2

Exemplary Codebook 1

In this section, we assume the following 4Tx rank-2 codebook, where the $W_2$ codebook is size-8.

$$W_1 = \begin{bmatrix} X^{(k)} & 0 \\ 0 & X^{(k)} \end{bmatrix}, \quad (38)$$

where (k=0, . . . N/$N_b$–1) without overlapping beams, and (k=0, . . . 2N/$N_b$–1) with overlapping beams.

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (39)$$

where $(Y_1, Y_2) \in \{(e_1^4, e_1^4), (e_2^4, e_2^4), (e_3^4, e_3^4), (e_4^4, e_4^4)\}$.

For a (N,Nb)=(N,Nb) 4Tx GoB codebook with overlapping beams, where N<=32, Nb=4, each 4Tx precoding matrix denoted by a pair of 4Tx codebook indices $(i_1^4, i_2^4)$ can be pruned from a corresponding 8Tx rank-2 precoding matrix denoted by a pair of 8Tx codebook indices $(i_1^8, i_2^8)$, where $$i_1^4 = \frac{32}{N} i_1^8,$$

$$i_2^4 = i_2^8, i_2^4 = 0, \ldots, 7$$

More specifically:

For a (N,Nb)=(8,4) 4Tx codebook with overlapping beams, each 4Tx precoding matrix denoted by $(i_1^4, i_2^4)$ can be pruned from a corresponding 8Tx rank-2 precoding matrix denoted by $(i_1^8, i_2^8)$, as given in Table 13.

TABLE 13

| 4Tx indices | $i_1^4$ 0-3 | 0 | 1 | 2 | $i_2^4$ 3 | 4 | 5 | 6 | 7 |
|---|---|---|---|---|---|---|---|---|---|
| Corresponding 8Tx indices | $i_1^8$ $4i_1^4$ | 0 | 1 | 2 | $i_2^8$ 3 | 4 | 5 | 6 | 7 |

For a (N,Nb)=(16,4) 4Tx codebook with overlapping beams, each 4Tx precoding matrix denoted by $(i_1^4, i_2^4)$ can be pruned from a corresponding 8Tx rank-2 precoding matrix denoted by $(i_1^8, i_2^8)$, as given in Table 14.

TABLE 14

| 4Tx indices | $i_1^4$ 0-7 | 0 | 1 | 2 | $i_2^4$ 3 | 4 | 5 | 6 | 7 |
|---|---|---|---|---|---|---|---|---|---|
| Corresponding 8Tx indices | $i_1^8$ $2i_1^4$ | 0 | 1 | 2 | $i_2^8$ 3 | 4 | 5 | 6 | 7 |

For a (N,Nb)=(32,4) 4Tx codebook with overlapping beams, each 4Tx precoding matrix denoted by $(i_1^4, i_2^4)$ can be pruned from a corresponding 8Tx rank-2 precoding matrix denoted by $(i_1^8, i_2^8)$, as given in Table 15.

TABLE 15

| 4Tx indices | $i_1^4$ 0-15 | 0 | 1 | 2 | 3 | $i_2^4$ 4 | 5 | 6 | 7 |
|---|---|---|---|---|---|---|---|---|---|
| Corresponding 8Tx indices | $i_1^8$ $i_1^4$ | 0 | 1 | 2 | 3 | $i_2^8$ 4 | 5 | 6 | 7 |

For a (N,Nb)=(N,Nb) 4Tx codebook without overlapping beams, where N<=32, Nb=4, each 4Tx precoding matrix denoted by a pair of 4Tx codebook indices ($i_1^4$, $i_2^4$) can be pruned from a corresponding 8Tx rank-2 precoding matrix denoted by a pair of 8Tx codebook indices ($i_1^8$, $i_2^8$), where $$i_1^4 = \frac{64}{N} i_1^8,$$

$$i_2^4 = i_2^8, i_2^4 = 0, \ldots, 7$$

More specifically:

For a (N,Nb)=(8,4) 4Tx codebook without overlapping beams, each 4Tx precoding matrix denoted by ($i_1^4$, $i_2^4$) can be pruned from a corresponding 8Tx rank-2 precoding matrix denoted by ($i_1^8$, $i_2^8$), as given in Table 16.

TABLE 16

| 4Tx indices | $i_1^4$ 0-1 | 0 | 1 | 2 | 3 | $i_2^4$ 4 | 5 | 6 | 7 |
|---|---|---|---|---|---|---|---|---|---|
| Corresponding 8Tx indices | $i_1^8$ $8i_1^4$ | 0 | 1 | 2 | 3 | $i_2^8$ 4 | 5 | 6 | 7 |

For a (N,Nb)=(16,4) 4Tx codebook without overlapping beams, each 4Tx precoding matrix denoted by ($i_1^4$, $i_2^4$) can be pruned from a corresponding 8Tx rank-2 precoding matrix denoted by ($i_1^8$, $i_2^8$), as given in Table 17.

TABLE 17

| 4Tx indices | $i_1^4$ 0-3 | 0 | 1 | 2 | 3 | $i_2^4$ 4 | 5 | 6 | 7 |
|---|---|---|---|---|---|---|---|---|---|
| Corresponding 8Tx indices | $i_1^8$ $4i_1^4$ | 0 | 1 | 2 | 3 | $i_2^8$ 4 | 5 | 6 | 7 |

For a (N,Nb)=(32,4) 4Tx codebook without overlapping beams, each 4Tx precoding matrix denoted by ($i_1^4$, $i_2^4$) can be pruned from a corresponding 8Tx rank-2 precoding matrix denoted by ($i_1^8$, $i_2^8$), as given in Table 18.

TABLE 18

| 4Tx indices | $i_1^4$ 0-7 | 0 | 1 | 2 | 3 | $i_2^4$ 4 | 5 | 6 | 7 |
|---|---|---|---|---|---|---|---|---|---|
| Corresponding 8Tx indices | $i_1^8$ $2i_1^4$ | 0 | 1 | 2 | 3 | $i_2^8$ 4 | 5 | 6 | 7 |

Exemplary Codebook 2

In this section, we assume the following 4Tx GoB codebook where the $W_2$ codebook is size-16.

$$W_1 = \begin{bmatrix} X^{(k)} & 0 \\ 0 & X^{(k)} \end{bmatrix}, \quad (40)$$

where (k=0, ... N/$N_b$–1) without overlapping beams, and (k=0, ... 2N/$N_b$–1) with overlapping beams.

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (41)$$

$(Y_1, Y_2) \in$ $\{(e_1^4, e_1^4), (e_2^4, e_2^4), (e_3^4, e_3^4), (e_4^4, e_4^4), (e_1^4, e_2^4), (e_2^4, e_3^4), (e_1^4, e_4^4), (e_2^4, e_4^4)\}.$

Such a 4Tx codebook cannot be completely pruned out of the 8Tx codebook unless the oversampling rate is N=32, which is equivalent to the 8Tx oversampling rate. In this case, when there is $W_1$ overlapping for 4Tx, each 4Tx precoding matrix denoted by a pair of 4Tx codebook indices ($i_1^4$, $i_2^4$) can be pruned from a corresponding 8Tx rank-2 precoding matrix denoted by a pair of 8Tx codebook indices ($i_1^8$, $i_2^8$), as given in Table 19, where $i_1^4 = i_1^8$, $i_1^4 = 0, \ldots 15$, $i_2^4 = i_2^8$, $i_2^3 = 0, \ldots, 15$

TABLE 19

| 4Tx indices | $i_1^4$ 0-15 | 0 | 1 | 2 | 3 | $i_2^4$ 4 | 5 | 6 | 7 |
|---|---|---|---|---|---|---|---|---|---|
| Corresponding 8Tx indices | $i_1^8$ $i_1^4$ | 0 | 1 | 2 | 3 | $i_2^8$ 4 | 5 | 6 | 7 |
| 4Tx indices | $i_1^4$ 0-15 | 8 | 9 | 10 | 11 | $i_2^4$ 12 | 13 | 14 | 15 |
| Corresponding 8Tx indices | $i_1^8$ $i_1^4$ | 8 | 9 | 10 | 11 | $i_2^8$ 12 | 13 | 14 | 15 |

For a (N,Nb)=(32,4) 4Tx GoB codebook without overlapping beams, each 4Tx precoding matrix denoted by a pair of 4Tx codebook indices ($i_1^4$, $i_2^4$) can be pruned from a corresponding 8Tx rank-2 precoding matrix denoted by a pair of 8Tx codebook indices ($i_1^8$, $i_2^8$), as given in Table 20, where $i_1^4 = 2i_1^8$, $i_1^4 = 0, \ldots, 7$, $i_2^4 = i_2^8$, $i_2^4 = 0, \ldots, 15$

TABLE 20

| 4Tx indices | $i_1^4$ 0-7 | 0 | 1 | 2 | 3 | $i_2^4$ 4 | 5 | 6 | 7 |
|---|---|---|---|---|---|---|---|---|---|
| Corresponding 8Tx indices | $i_1^8$ $2i_1^4$ | 0 | 1 | 2 | 3 | $i_2^8$ 4 | 5 | 6 | 7 |
| 4Tx indices | $i_1^4$ 0-7 | 8 | 9 | 10 | 11 | $i_2^4$ 12 | 13 | 14 | 15 |
| Corresponding 8Tx indices | $i_1^8$ $2i_1^4$ | 8 | 9 | 10 | 11 | $i_2^8$ 12 | 13 | 14 | 15 |

Rank-3

A rank-3 4Tx GoB codebook cannot be pruned from the rank-3 8Tx codebook. This can be seen from the 8Tx design, which followed the (N,Nb)=(16,8) structure, where $$B = [b_0 \; b_1 \; \ldots \; b_{15}] \; [B]_{1+m,1+n} = e^{j\frac{2\pi mn}{16}}, m = 0, 1, 2, 3, n = 0, 1, \ldots, 15$$

$$X^{(k)} \in \left\{ \begin{array}{c} [b_{4k \bmod 32} \; b_{(4k+1) \bmod 32} \; b_{(4k+2) \bmod 32} \; b_{(4k+3) \bmod 32} b_{(4k+4) \bmod 32} \; b_{(4k+5) \bmod 32} \; b_{(4k+6) \bmod 32} \; b_{(4k+7) \bmod 32}], \\ k = 0, \ldots 3 \end{array} \right\}$$

$$W_1^{(k)} = \begin{bmatrix} X^{(k)} & 0 \\ 0 & X^{(k)} \end{bmatrix}, \text{Codebook1}: C_1\{W_1^{(0)}, W_1^{(1)}, W_1^{(2)}, W_1^{(3)}\} \tag{42}$$

$$W_2 \in CB_2 = \left\{ \frac{1}{\sqrt{2}} \begin{bmatrix} Y_1 & Y_2 \\ Y_1 & -Y_2 \end{bmatrix} \right\}, \tag{43}$$

$$(Y_1, Y_2) \in \left\{ \begin{array}{l} (e_1^4, [e_1^4, e_5^4]), (e_2^4, [e_2^4, e_6^4]), (e_3^4, [e_3^4, e_7^4]), (e_4^4, [e_4^4, e_8^4]), \\ (e_5^4, [e_1^4, e_5^4]), (e_6^4, [e_2^4, e_6^4]), (e_7^4, [e_3^4, e_7^4]), (e_8^4, [e_4^4, e_8^4]), \\ ([e_1^4, e_5^4], e_1^4), ([e_2^4, e_6^4], e_2^4), ([e_3^4, e_7^4], e_3^4), ([e_4^4, e_8^4], e_4^4), \\ ([e_1^4, e_5^4], e_5^4), ([e_2^4, e_6^4], e_6^4), ([e_3^4, e_7^4], e_7^4), ([e_4^4, e_8^4], e_8^4), \end{array} \right\}. \tag{44}$$

The column vectors of each rank-3 8Tx precoding matrix comprise critically sampled (e.g. sampling rate 4) 4Tx DFT vectors in order to ensure that a rank-3 8Tx precoding matrix satisfies the unitary constraint. For 4Tx, in order to achieve the unitary constraint, column vectors of each rank-3 4Tx precoding matrix must comprise critically sampled (e.g. sampling rate 2) 2Tx DFT vectors. As such, the column vectors of any 4Tx GoB matrix will always span across different $W_1$ matrices of the 8Tx codebook, leaving it impossible to construct the rank-3 4-Tx codebook by pruning the 8Tx codebook.

However the rank-3 4Tx GoB component can be pruned from the rank-6 8Tx codebook, where $$C^{(4)} = \{W^{(4)}\}_{rank3} \subseteq \{W^{(8)}_{[(n1,n2,n3,n4),(m1,m2,m3)]}\}_{rank6} \tag{45}$$

e.g., the $(n1,n2,n3,n4)$-th row and $(m1, m2, m3)$-th column of a rank-6 8Tx precoding matrix corresponding to a pair of codebook index $(i_1^8, i_2^8)$ are used to construct a 4Tx precoding matrix corresponding to a pair of codebook indices $(i_1^4, i_2^4)$.

For instance, for the (N,Nb)=(4,4) GoB codebook, the pruning shown in Table 21 is possible:

TABLE 21

| 4Tx indices | $i_1^4$ | $i_2^4$ |
|---|---|---|
|  | 0 | arbitrary |
| Corresponding 8Tx indices | $i_1^8$ | $i_2^8$ |
|  | 0 | 0 |

Note that the column-selection method $(m1, m2, m3)$ may depend on the 4Tx GoB precoding matrix. For instance:

$$(Y_1, Y_2) \in \{(e_1^4[e_1^4, e_3^4])\} \Rightarrow (m1, m2, m3) = (1,2,6) \tag{46}$$

$$(Y_1, Y_2) \in \{(e_3^4[e_1^4, e_3^4])\} \Rightarrow (m1, m2, m3) = (5,2,6) \tag{47}$$

$$(Y_1, Y_2) \in \{([e_1^4, e_3^4], e_1^4)\} \Rightarrow (m1, m2, m3) = (1,5,6) \tag{48}$$

$$(Y_1, Y_2) \in \{([e_1^4, e_3^4], e_3^4)\} \Rightarrow (m1, m2, m3) = (1,5,6) \tag{49}$$

Rank-4

Similarly, the rank-4 4Tx GoB component cannot be pruned from the rank-4 8Tx codebook. However, a rank-4 4Tx GoB component can be pruned from the rank-8 8Tx codebook, where $$C^{(4)} = \{W^{(4)}\}_{rank-4} \subseteq \{W^{(8)}_{[(n1,n2,n3,n4),(m1,m2,m3,m4)]}\}_{rank-8} \tag{50}$$

e.g., the $(n1,n2,n3,n4)$-th row and $(m1, m2, m3, m4)$-th column of a rank-8 8Tx precoding matrix corresponding to a pair of codebook index $(i_1^8, i_2^8)$ is used to construct a 4Tx precoding matrix corresponding to a pair of codebook indices $(i_1^4, i_2^4)$. For instance for the (N,Nb)=(4,4) GoB codebook, the pruning shown in Table 22 is possible.

TABLE 22

| 4Tx indices | $i_1^4$ | $i_2^4$ |
|---|---|---|
|  | 0 | arbitrary |
| Corresponding 8Tx indices | $i_1^8$ | $i_2^8$ |
|  | 0 | 0 |

Note that the column-selection method $(m1, m2, m3, m4)$ may depend on the 4Tx GoB precoding matrix. For instance:

$$(Y_1, Y_2) \in \{([e_1^4, e_3^4], [e_1^4, e_3^4])\} \Rightarrow (m1, m2, m3, m4) = (1,5,2,6) \tag{51}$$

$$(Y_1, Y_2) \in \{([e_2^4, e_4^4], [e_2^4, e_4^4])\} \Rightarrow (m1, m2, m3, m4) = (3,7,4,8) \tag{52}$$

$$(Y_1, Y_2) \in \{([e_1^4, e_3^4], [e_2^4, e_4^4])\} \Rightarrow (m1, m2, m3, m4) = (1,5,4,8) \tag{53}$$

$$(Y_1, Y_2) \in \{([e_2^4, e_4^4], [e_1^4, e_3^4],)\} \Rightarrow (m1, m2, m3, m4) = (3,7,2,6) \tag{54}$$

Row Selection Vector (n1,n2,n3,n4) for Pruning

Figure 5:
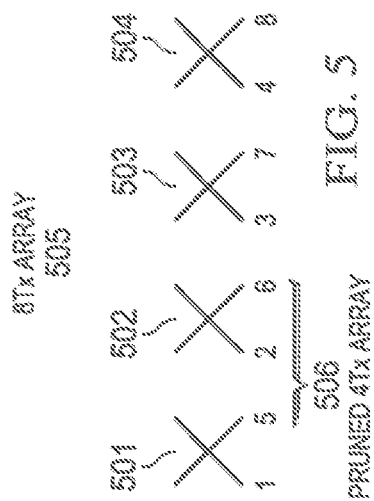
FIG. 5 illustrates an example of using a row selection vector to prune antenna pairs in an 8Tx array.

In one embodiment, the row selection vector $(n1,n2,n3,n4)$ is hard-coded/fixed in the specification, and is not signalled to the UE. FIG. 5 illustrates an example of using a row selection vector to prune antenna pairs in an 8Tx array. Eight antennas 1-8 are arranged in four cross-polarized pairs 501-504. Using the row selection vector $(n1,n2,n3,n4)=[1,2,5,6]$ prunes the first two cross-polarized antenna pairs 501, 502 from the 8Tx array 505 for a 4Tx deployment 506.

In another embodiment, the row selection vector $(n1,n2,n3,n4)$ may be semi-statically radio resource control (RRC)-configured for a UE, and can be different for different UEs. There are multiple possible methods for RRC signalling $(n1,n2,n3,n4)$ Example 1

For the k-th antenna port of a 4-Tx MIMO system (k=1, 2, 3, 4), the eNodeB signals the corresponding virtual antenna port index $n_k$ in an 8-Tx MIMO system. This requires a signaling overhead of log 2(8)×4=12 bits.

Example 2

As there are a total of $C_4^8$=70 ways of choosing 4-antenna ports out of an 8-antenna port system, log 2(70)=7-bits are used to signal the combinatorial index of the antenna selection vector $(_{n1,n2,n3,n4})$. This achieves 5-bits of overhead savings.

It is further possible to down-size the set of candidate antenna selection vectors $\{(_{n1,n2,n3,n4})\}$, which may further reduce the RRC signalling overhead. For instance, the eNodeB may use 1-bit to configure the UE to assume $(_{n1,n2,n3,n4})=[1,2,5,6]$ or $(_{n1,n2,n3,n4})=[1,4,5,8]$. With $(_{n1,n2,n3,n4})=[1,4,5,6]$, two adjacent cross-polarized antenna pairs are configured, which models 4Tx cross-polarized antennas with small antenna spacing. With $(_{n1,n2,n3,n4})=[1,4,5,8]$, two antenna pairs with large antenna spacing are modelled. This may be important for some wireless operators that must deploy wide antenna spacing due to their GSM/HSPA/LTE spectrum farming limitation, where two separate antenna radomes with large spacing are used for 4Tx MIMO.

For a UE configured in transmission mode 10, where the UE is configured with multiple CSI-RS resources, the row selection vector $(_{n1,n2,n3,n4})$ can be independently configured for each 4-Tx CSI-RS resource.

Example of 4Tx Codebook from 8Tx Pruning

Using the methods proposed above for rank-1,2,3,4Tx GoB codebooks, one example of a 4Tx codebook is summarized below.

Release 12 enhancement is achieved by augmenting the Release 8 codebook with double-codebook (DCB) components.

component 1 (Release 8): W1=identity matrix, W2 selected from Release 8 codebook, component 2 (DCB): . . . pruned Release 10 8Tx codebook, select four rows out of eight rows from the 8Tx precoding matrices (i.e., a subset of the 8Tx matrices).

Rank-1:
Component 1: Release 8

$$W_1=I_4, \quad (55)$$

$$W_2 \in C_{2,R8-4Tx-R1} \quad (56)$$

Component 2: DCB:

$W_1$: $i_1=0, \ldots 15$, each $W_1$ is the $(1,2,5,6)^{th}$ row of the $(i_1)^{th}$ 8Tx $W_1$ codebook.

$W_2$: $i_2=0, \ldots 15$, same as 8Tx $W_2$ codebook

Note: the 4Tx DCB components are the $(1,2,5,6)^{th}$ row of the 8Tx DCB codebook. This is equivalent to a (N,Nb)= (32,4) codebook with adjacent $W_1$ overlapping.

Rank-2:
Component 1: Release 8

$$W_1=I_4, \quad (57)$$

$$W_2 \in C_{2,R8-4Tx-R2} \quad (58)$$

Component 2: DCB:

$W_1$: $i_1=0, \ldots 15$, each $W_1$ is the $(1,2,5,6)^{th}$ row of the $(i_1)^{th}$ 8Tx $W_1$ codebook.

$W_2$: $i_2=0, \ldots 15$, same as 8Tx $W_2$ codebook.

Note: the 4Tx DCB components are the $(1,2,5,6)^{th}$ row of the 8Tx DCB codebook. This is equivalent to a (N,Nb)= (32,4) codebook with adjacent $W_1$ overlapping.

Rank-3/4:
Re-use the Release 8 codebook.

Further Enhancement of 4Tx Codebook

Any of the codebooks proposed above can be further enhanced by adding more 4Tx precoding matrices. Note that in the sections above, the Release 8 4Tx codebook is inherited in Release 12 4Tx codebook in the form of W=W$_1$W$_2$, where W$_1$ is a 4×4 identity matrix and W$_2$ are taken from Release 8 codebook. An extension of this design is possible, where the W$_1$ codebook not only includes the 4×4 identity matrix 14, but also includes other size 4×4 matrices. One exemplary extension is where the W$_1$ codebook comprises of a set of diagonal matrices, where each diagonal element performs phase rotation for each row of W$_2$ matrix.

Following this design principle, an example of a further-enhanced 4Tx codebook is given below.

Rank-1/2:

$$C_1=\{W_1^{(0)}, W_1^{(1)}, W_1^{(2)}, \ldots, W_1^{N-1}\} \quad (59)$$

where:

For $i_1=0, \ldots, N/2-1$, $W_1^{(0)}, W_1^{(1)}, W_1^{(2)} \ldots W_1^{(N/2-1)}$ are diagonal matrices (e.g. performing phase rotation), and W$_2$ inherits the Release 8 4Tx codebook. In particular, for $i_1=0$, $W_1^{(0)}=I_4$. This allows the Release 8 codebook to be re-used without change in Release 12.

When $i_1=(N/2), \ldots, N-1$, then $W_1^{(N/2)} \ldots W_1^{(N-1)}$ are block diagonal matrices designed with double-codebook structure. In this case, W$_1$ and W$_2$ can use any of the DCB codebook components proposed in the sections above. As one example, W$_1$/W$_2$ may be pruned 8Tx codebooks, where N=32, and $W_1$: $i_1=16, \ldots 31$, each $W_1$ is the $(1,2,5,6)^{th}$ row of the $(i_1-15)^{th}$ 8Tx $W_1$ matrix, $W_2$: $i_2=0, \ldots 15$, same as 8Tx $W_2$ codebook.

Herein, the $W_1$ overhead is 5-bit, and $W_2$ overhead is 4-bits per subband.

Rank-3 and rank-4 may follow the same enhancement design if necessary.

Alternative Design for Rank-2

The GoB designs proposed above assumed that each $W_1$ matrix comprises a group of adjacent DFT beams. It is noted that the beams in each $W_1$ grid are not necessarily adjacent, which makes other designs possible. In this section we propose an example rank-2 design with non-adjacent beams in $W_1$.

To recapture the notations, note that $$W_1^{(k)} = \begin{bmatrix} X^{(k)} & 0 \\ 0 & X^{(k)} \end{bmatrix} \quad (60)$$

where $X^{(k)}$ comprises of multiple 2×1 DFT beams, k=$i_1$. In the following section, we assume an over-sampling ratio N=16, but the proposed design can be easily generalized to other N values.

Alternative Design 1

It is noted that an N-times oversampled 2×1 DFT beam expressed as $$b_{l \bmod N} = \begin{bmatrix} 1 \\ e^{j2\pi l/N} \end{bmatrix}, l = 0, \ldots N-1$$

is orthogonal to $$b_{(l+N/2) \bmod N}.$$

Therefore each $W_1$ grid may comprise two orthogonal DFT beams expressed as $$W_1^{(k)} = \begin{bmatrix} X^{(k)} & 0 \\ 0 & X^{(k)} \end{bmatrix}, \quad (61)$$

$$X^{(k)} = [b_{l\,mod\,N}, b_{(l+N/2)mod\,N}], k = 1. \quad (62)$$

The $W_2$ codebook may comprise beam selection and co-phasing matrixes, for example, denoted as:

$$W_2 = C_2 = \Omega \circ \left\{ \begin{pmatrix} e_1 & e_2 \\ e_1 & e_2 \end{pmatrix}, \begin{pmatrix} e_1 & e_2 \\ e_1 & -e_2 \end{pmatrix}, \begin{pmatrix} e_1 & e_2 \\ -e_1 & e_2 \end{pmatrix}, \begin{pmatrix} e_1 & e_2 \\ -e_1 & -e_2 \end{pmatrix} \right\} \quad (63)$$

where ○ denotes the Schur product, $e_i^2$ is a 2×1 column vector with all zero entries except the i-th element being 1, and $$\Omega = \left\{ \begin{pmatrix} I_2 & \\ & e^{j2\pi k/N} I_2 \end{pmatrix} \right\}_{k=\Xi} \quad (64)$$

are diagonal matrices that perform co-phasing.
As an example, $$\Omega = \left\{ \begin{pmatrix} I_2 & \\ & I_2 \end{pmatrix}, \begin{pmatrix} I_2 & \\ & -I_2 \end{pmatrix}, \begin{pmatrix} I_2 & \\ & jI_2 \end{pmatrix}, \begin{pmatrix} I_2 & \\ & -jI_2 \end{pmatrix} \right\}, \quad (65)$$

which results in a 4-bits $W_2$ codebook. Correspondingly, for each $X^{(k)} = [b_{l\,mod\,N}, b_{(l+N/2)mod\,N}]$, k=l=i$_1$, the corresponding sixteen composite matrices $W=W_{i_1,i_2}$, i$_2$=0, . . . 15 are expressed as shown in Table 23.

TABLE 23

| | | |
|---|---|---|
| i$_2$ = 0, . . . , 3 | $W_{k,0} = \begin{pmatrix} b_{lmodN} & b_{(l+N/2)modN} \\ b_{lmodN} & b_{(l+N/2)modN} \end{pmatrix}$ | |
| | $W_{k,1} = \begin{pmatrix} b_{lmodN} & b_{(l+N/2)modN} \\ b_{lmodN} & -b_{(l+N/2)modN} \end{pmatrix}$ | |
| | $W_{k,2} = \begin{pmatrix} b_{lmodN} & b_{(l+N/2)modN} \\ -b_{lmodN} & b_{(l+N/2)modN} \end{pmatrix}$ | |
| | $W_{k,3} = \begin{pmatrix} b_{lmodN} & b_{(l+N/2)modN} \\ -b_{lmodN} & -b_{(l+N/2)modN} \end{pmatrix}$ | |
| i$_2$ = 4, . . . , 7 | $W_{k,4} = \begin{pmatrix} b_{lmodN} & b_{(l+N/2)modN} \\ -b_{lmodN} & -b_{(l+N/2)modN} \end{pmatrix}$ | |
| | $W_{k,5} = \begin{pmatrix} b_{lmodN} & b_{(l+N/2)modN} \\ -b_{lmodN} & b_{(l+N/2)modN} \end{pmatrix}$ | |
| | $W_{k,6} = \begin{pmatrix} b_{lmodN} & b_{(l+N/2)modN} \\ b_{lmodN} & -b_{(l+N/2)modN} \end{pmatrix}$ | |
| | $W_{k,7} = \begin{pmatrix} b_{lmodN} & b_{(l+N/2)modN} \\ b_{lmodN} & b_{(l+N/2)modN} \end{pmatrix}$ | |
| i$_2$ = 8, . . . , 11 | $W_{k,8} = \begin{pmatrix} b_{lmodN} & b_{(l+N/2)modN} \\ jb_{lmodN} & jb_{(l+N/2)modN} \end{pmatrix}$ | |
| | $W_{k,9} = \begin{pmatrix} b_{lmodN} & b_{(l+N/2)modN} \\ jb_{lmodN} & -jb_{(l+N/2)modN} \end{pmatrix}$ | |
| | $W_{k,10} = \begin{pmatrix} b_{lmodN} & b_{(l+N/2)modN} \\ -jb_{lmodN} & jb_{(l+N/2)modN} \end{pmatrix}$ | |

TABLE 23-continued

| | | |
|---|---|---|
| | $W_{k,11} = \begin{pmatrix} b_{lmodN} & b_{(l+N/2)modN} \\ -jb_{lmodN} & -jb_{(l+N/2)modN} \end{pmatrix}$ | |
| i$_2$ = 12, . . . , 15 | $W_{k,12} = \begin{pmatrix} b_{lmodN} & b_{(l+N/2)modN} \\ -jb_{lmodN} & -jb_{(l+N/2)modN} \end{pmatrix}$ | |
| | $W_{k,13} = \begin{pmatrix} b_{lmodN} & b_{(l+N/2)modN} \\ -jb_{lmodN} & jb_{(l+N/2)modN} \end{pmatrix}$ | |
| | $W_{k,14} = \begin{pmatrix} b_{lmodN} & b_{(l+N/2)modN} \\ jb_{lmodN} & -jb_{(l+N/2)modN} \end{pmatrix}$ | |
| | $W_{k,15} = \begin{pmatrix} b_{lmodN} & b_{(l+N/2)modN} \\ jb_{lmodN} & jb_{(l+N/2)modN} \end{pmatrix}$ | |

It is noted that $W_{i_1,i_2}$, i$_2$=4, . . . ,7 are identical to $W_{i_1,i_2}$, i$_2$=0, . . . , 3, and $W_{i_1,i_2}$, i$_2$=12, . . . , 15 are identical to $W_{i_1,i_2}$, i$_2$=8, . . . , 11. Therefore it's possible to reduce the $W_2$ size to 3-bits (i$_2$=0, . . . , 7), where $$\Omega = \left\{ \begin{pmatrix} I_2 & \\ & I_2 \end{pmatrix}, \begin{pmatrix} I_2 & \\ & jI_2 \end{pmatrix} \right\}, \quad (66)$$

and the composite precoder $W=W_{i_1,i_2}$ is given by the values shown in Table 24.

TABLE 24

| | | |
|---|---|---|
| i$_2$ = 0, . . . , 3 | $W_{k,0} = \begin{pmatrix} b_{lmodN} & b_{(l+N/2)modN} \\ b_{lmodN} & b_{(l+N/2)modN} \end{pmatrix}$ | |
| | $W_{k,1} = \begin{pmatrix} b_{lmodN} & b_{(l+N/2)modN} \\ b_{lmodN} & -b_{(l+N/2)modN} \end{pmatrix}$ | |
| | $W_{k,2} = \begin{pmatrix} b_{lmodN} & b_{(l+N/2)modN} \\ -b_{lmodN} & b_{(l+N/2)modN} \end{pmatrix}$ | |
| | $W_{k,3} = \begin{pmatrix} b_{lmodN} & b_{(l+N/2)modN} \\ -b_{lmodN} & -b_{(l+N/2)modN} \end{pmatrix}$ | |
| i$_2$ = 4, . . . , 7 | $W_{k,4} = \begin{pmatrix} b_{lmodN} & b_{(l+N/2)modN} \\ jb_{lmodN} & jb_{(l+N/2)modN} \end{pmatrix}$ | |
| | $W_{k,5} = \begin{pmatrix} b_{lmodN} & b_{(l+N/2)modN} \\ jb_{lmodN} & -jb_{(+N/2)modN} \end{pmatrix}$ | |
| | $W_{k,6} = \begin{pmatrix} b_{lmodN} & b_{(l+N/2)modN} \\ -jb_{lmodN} & jb_{(l+N/2)modN} \end{pmatrix}$ | |
| | $W_{k,7} = \begin{pmatrix} b_{lmodN} & b_{(l+N/2)modN} \\ -jb_{lmodN} & -jb_{(l+N/2)modN} \end{pmatrix}$ | |

Note that other co-phasing methods $\Omega$ are possible, for example $$\Omega = \left\{ \begin{pmatrix} I_2 & \\ & I_2 \end{pmatrix}, \begin{pmatrix} I_2 & \\ & jI_2 \end{pmatrix}, \begin{pmatrix} I_2 & \\ & e^{j\frac{\pi}{4}} I_2 \end{pmatrix}, \begin{pmatrix} I_2 & \\ & e^{j\frac{3\pi}{4}} I_2 \end{pmatrix} \right\}. \quad (67)$$

In this case, the $W_2$ codebook size is 4-bits.

Generalization

The precoders proposed above as alternative design 1 may be combined with the precoders in the previous sections to construct the final rank-2 codebook. For example, assuming over-sampling ratio N (e.g. N=16), $N_b$=4, the rank-2 codebook may be expressed as $$W_1 \in C_1 = \left\{ \begin{bmatrix} X^{(k)} & 0 \\ 0 & X^{(k)} \end{bmatrix} \right\}, i_1 = k = 0, \ldots 2N/N_b - 1 \quad (68)$$

->size N/2
When $i_2 = 0, \ldots, 7$:

$$X^{(k)} = \begin{bmatrix} b_{(N_b k/2) \bmod N} & b_{(N_b k/2 + 1) \bmod N} & \cdots & b_{(N_b k/2 + N_b - 1) \bmod N} \end{bmatrix} \quad (69)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (70)$$

$$(Y_1, Y_2) \in \{(e_1^4, e_1^4), (e_2^4, e_2^4), (e_3^4, e_3^4), (e_4^4, e_4^4)\} \quad (71)$$

When $i_2 = 8, \ldots, 15$:

$$X^{(k)} = [b_{(k-N/2) \bmod N}, b_{k \bmod N}] \quad (72)$$

$$W_2 \in CB_2 = \quad (73)$$

$$\frac{1}{\sqrt{2}} \times \left\{ \begin{bmatrix} Y_1 & Y_2 \\ Y_1 & Y_2 \end{bmatrix}, \begin{bmatrix} Y_1 & Y_2 \\ Y_1 & -Y_2 \end{bmatrix}, \begin{bmatrix} Y_1 & Y_2 \\ -Y_1 & Y_2 \end{bmatrix}, \begin{bmatrix} Y_1 & Y_2 \\ -Y_1 & -Y_2 \end{bmatrix}, \begin{bmatrix} Y_1 & Y_2 \\ jY_1 & jY_2 \end{bmatrix}, \begin{bmatrix} Y_1 & Y_2 \\ jY_1 & -jY_2 \end{bmatrix}, \begin{bmatrix} Y_1 & Y_2 \\ -jY_1 & jY_2 \end{bmatrix}, \begin{bmatrix} Y_1 & Y_2 \\ -jY_1 & -jY_2 \end{bmatrix} \right\},$$

$$(Y_1, Y_2) \in \{(e_1^2, e_2^2)\} \quad (74)$$

The $W_1$ overhead is log $2(N/2) = 3$-bits, and the $W_2$ overhead is 4-bits.

Note that the combined codebook can be re-expressed below.

$$W_1 \in C_1 = \left\{ \begin{bmatrix} X^{(0)} & 0 \\ 0 & X^{(0)} \end{bmatrix}, \ldots \begin{bmatrix} X^{(N-1)} & 0 \\ 0 & X^{(N-1)} \end{bmatrix} \right\} \quad (75)$$

→size N
When $$W_1 = \begin{bmatrix} X^{(k)} & 0 \\ 0 & X^{(k)} \end{bmatrix} (k = i_1 = 0, \ldots N/2 - 1): \quad (76)$$

$$X^{(k)} = \begin{bmatrix} b_{(N_b k/2) \bmod N} & b_{(N_b k/2 + 1) \bmod N} & \cdots & b_{(N_b k/2 + N_b - 1) \bmod N} \end{bmatrix} \quad (77)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\} \quad (78)$$

$$(Y_1, Y_2) \in \{(e_1^4, e_1^4), (e_2^4, e_2^4), (e_3^4, e_3^4), (e_4^4, e_4^4)\} \quad (79)$$

When $$W_1 = \begin{bmatrix} X^{(k)} & 0 \\ 0 & X^{(k)} \end{bmatrix} \left(k = i_1 = \frac{N}{2}, \ldots, N-1\right): \quad (80)$$

$$X^{(k)} = [b_{(k-N/2) \bmod N}, b_{k \bmod N}] \quad (81)$$

$$\quad (82)$$

$$W_2 \in CB_2 =$$

$$\frac{1}{\sqrt{2}} \times \left\{ \begin{bmatrix} Y_1 & Y_2 \\ Y_1 & Y_2 \end{bmatrix}, \begin{bmatrix} Y_1 & Y_2 \\ Y_1 & -Y_2 \end{bmatrix}, \begin{bmatrix} Y_1 & Y_2 \\ -Y_1 & Y_2 \end{bmatrix}, \begin{bmatrix} Y_1 & Y_2 \\ -Y_1 & -Y_2 \end{bmatrix}, \begin{bmatrix} Y_1 & Y_2 \\ jY_1 & jY_2 \end{bmatrix}, \begin{bmatrix} Y_1 & Y_2 \\ jY_1 & -jY_2 \end{bmatrix}, \begin{bmatrix} Y_1 & Y_2 \\ -jY_1 & jY_2 \end{bmatrix}, \begin{bmatrix} Y_1 & Y_2 \\ -jY_1 & -jY_2 \end{bmatrix} \right\},$$

$$(Y_1, Y_2) \in \{(e_1^2, e_2^2)\} \quad (83)$$

In this case, the $W_1$ overhead is log $2(N) = 4$-bits, and the $W_2$ overhead is 3-bits.

Another possible combinatorial design is $$W_1 \in C_1 = \left\{ \begin{bmatrix} X^{(0)} & 0 \\ 0 & X^{(0)} \end{bmatrix}, \ldots \begin{bmatrix} X^{(N-1)} & 0 \\ 0 & X^{(N-1)} \end{bmatrix} \right\} \quad (84)$$

→size N
When $$W_1 = \begin{bmatrix} X^{(k)} & 0 \\ 0 & X^{(k)} \end{bmatrix} (k = i_1 = 0, \ldots, N/2 - 1): \quad (85)$$

$$X^{(k)} = \begin{bmatrix} b_{(N_b k/2) \bmod N} & b_{(N_b k/2 + 1) \bmod N} & \cdots & b_{(N_b k/2 + N_b - 1) \bmod N} \end{bmatrix} \quad (86)$$

$$W_2 \in CB_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\}, \quad (87)$$

$$(Y_1, Y_2) \in \{(e_1^4, e_1^4), (e_2^4, e_2^4), (e_3^4, e_3^4), \quad (88)$$

$$(e_4^4, e_4^4), (e_1^4, e_2^4), (e_2^4, e_3^4), (e_1^4, e_4^4), (e_2^4, e_4^4)\}$$

When $$W_1 = \begin{bmatrix} X^{(k)} & 0 \\ 0 & X^{(k)} \end{bmatrix} \left(k = i_1 = \frac{N}{2}, \ldots, N-1\right): \quad (89)$$

$$X^{(k)} = [b_{(k-N/2) \bmod N}, b_{k \bmod N}] \quad (90)$$

$$\quad (91)$$

$$W_2 \in CB_2 = \frac{1}{\sqrt{2}} \times$$

-continued $$\left\{ \begin{bmatrix} Y_1 & Y_2 \\ Y_1 & Y_2 \end{bmatrix}, \begin{bmatrix} Y_1 & Y_2 \\ Y_1 & -Y_2 \end{bmatrix}, \begin{bmatrix} Y_1 & Y_2 \\ -Y_1 & Y_2 \end{bmatrix}, \begin{bmatrix} Y_1 & Y_2 \\ -Y_1 & -Y_2 \end{bmatrix}, \right.$$
$$\begin{bmatrix} Y_1 & Y_2 \\ jY_1 & jY_2 \end{bmatrix}, \begin{bmatrix} Y_1 & Y_2 \\ jY_1 & -jY_2 \end{bmatrix}, \begin{bmatrix} Y_1 & Y_2 \\ -jY_1 & jY_2 \end{bmatrix}, \begin{bmatrix} Y_1 & Y_2 \\ -jY_1 & -jY_2 \end{bmatrix},$$
$$\begin{bmatrix} Y_1 & Y_2 \\ e^{j\frac{\pi}{4}}Y_1 & e^{j\frac{\pi}{4}}Y_2 \end{bmatrix}, \begin{bmatrix} Y_1 & Y_2 \\ e^{j\frac{\pi}{4}}Y_1 & -e^{j\frac{\pi}{4}}Y_2 \end{bmatrix}, \begin{bmatrix} Y_1 & Y_2 \\ -e^{j\frac{\pi}{4}}Y_1 & e^{j\frac{\pi}{4}}Y_2 \end{bmatrix}, \begin{bmatrix} Y_1 & Y_2 \\ -e^{j\frac{\pi}{4}}Y_1 & -e^{j\frac{\pi}{4}}Y_2 \end{bmatrix},$$
$$\left. \begin{bmatrix} Y_1 & Y_2 \\ e^{j\frac{3\pi}{4}}Y_1 & e^{j\frac{3\pi}{4}}Y_2 \end{bmatrix}, \begin{bmatrix} Y_1 & Y_2 \\ e^{j\frac{3\pi}{4}}Y_1 & -e^{j\frac{3\pi}{4}}Y_2 \end{bmatrix}, \begin{bmatrix} Y_1 & Y_2 \\ -e^{j\frac{3\pi}{4}}Y_1 & e^{j\frac{3\pi}{4}}Y_2 \end{bmatrix}, \begin{bmatrix} Y_1 & Y_2 \\ -e^{j\frac{3\pi}{4}}Y_1 & -e^{j\frac{3\pi}{4}}Y_2 \end{bmatrix} \right\}$$

$(Y_1, Y_2) \in \{(e_1^2, e_2^2)\}$ (92)

The $W_1$ overhead is log 2(N)=4-bits, and the $W_2$ overhead is 4-bits.

Inheritance of the Release 8 Codebook in Release 12

Using Release 8 Precoders for $W_2$

As proposed in the previous sections, it is possible for the Release 12 codebook to inherit the Release 8 codebook as a subset. This can be achieved by using the Release 8 4Tx precoder as the codebook for $W_2$ which is associated with W1=4×4 identity matrix 14. This is applicable for rank-i to rank-4, where the subband $W_2$ overhead is 4-bits per subband.

It is also possible to divide the Release 8 precoders into N groups, where each group has 16/N Release 8 precoders that form a different $W_2$ codebook. For each $W_2$ codebook, the $W_1$ matrix is equivalent to a 4×4 identity matrix. The subband $W_2$ overhead will therefore be reduced to log 2(16/N) bits.

For example

The Release 8 codebook is inherited in Release 12 codebook, corresponding to two $W_1$ matrices, e.g., $W_1^k=I_4$, k=0, 1, For $W_1^0$, the $W_2$ codebook comprises the first eight Release 8 precoders. For $W_1^1$, the $W_2$ codebook comprises the last eight Release 8 precoders.

Other values of N are possible to adapt the subband PMI bit-width. For example, N=2 corresponds to a subband size of log 2(8)=3-bits, N=4 corresponds to a subband size of log 2(4)=2 bits.

The above designs can be applied for rank-1, rank-2, rank-3, and rank-4.

Constructing $W_1$ with Release 8 Precoders and $W_2$ with Column Selection

It is further possible to inherit the Release 8 codebook in Release 12 by constructing the $W_1$ matrix with Release 8 precoders, and constructing the $W_2$ codebook with column selection matrices.

For example:

For rank-1, $W_1$ includes all or a subset of Release 8 rank-1 vectors. The size of $W_1$ is given by 4×L, where 1<=L<=16 is the number of rank-1 Release 8 codebook vectors that are included in $W_1$. The $W_2$ codebook comprises L column-selection vectors $[e_1, e_2 \ldots e_L]$, where $e_i$ is an L×1 vector of all zero entries, except for the i-th entry, which is equivalent to 1.

For rank-r (r=2, 3, 4), the columns of $W_1$ comprise all or a subset of Release 8 rank-r vectors, e.g. this may be denoted as $W_1 = [W_{s(0)}^{Rel.8-rank-r} W_{s(1)}^{Rel.8-rank-r} \ldots W_{s(L-1)}^{Rel.8-rank-r}]$ (93)

where $W_{s(1)}^{Rel.8-rank-r}$ is the s(1)-th Release 8 precoder. The size of $W_1$ is 4×rL, where 1<=L<=16 is the number of rank-r Release 8 codebook matrices in $W_1$. The $W_2$ codebook comprises L column-selection matrices, where the 1-th $W_2$ matrix (1<=l<=L) is $$W2 = \begin{bmatrix} 0_{r(l-1) \times r} \\ I_{r \times r} \\ 0_{r(L-l) \times r} \end{bmatrix}$$ (94)

Alternatively, the $W_1$ matrix can be constructed in a block diagonal manner.

For example, for rank-1:

$$W_1 = \begin{bmatrix} A & 0 \\ 0 & B \end{bmatrix},$$ (95)

where A and B are of sizes 2×16, where the 1-th column of A is the first two rows of the 1-th Release 8 precoder, and the 1-th column of B is the last two rows of the 1-th Release 8 precoder, l=1, ..., 16.

The $W_2$ matrix can be written in the form of $$W_2^k = \begin{bmatrix} e_k & 0 \\ 0 & e_k \end{bmatrix}, k = 1, \ldots, 16,$$ (96)

where $e_k$ is the k-th column of a 16×16 identity matrix.

For rank-r, r=2, ..., 4:

$$W_1 = \begin{bmatrix} A & 0 \\ 0 & B \end{bmatrix},$$ (97)

where A and B are of sizes 2×16r, and where
A $[W_1^{Rel.8-rank-r} W_2^{Rel.8-rank-r} \ldots W_{16}^{Rel.8-rank-r}]_{(1:2)}$,
$P_{(1:2)}$ is the first and second row of matrix P, and
B $[W_1^{Rel.8-rank-r} W_2^{Rel.8-rank-r} \ldots W_{16}^{Rel.8-rank-r}]_{(3:4)}$,
$P_{(3:4)}$ is the third and fourth row of matrix P.

For the $W_2$ codebook, $$W_2^k = \begin{bmatrix} e_k & 0 \\ 0 & e_k \end{bmatrix},$$ (98)

$k = 1, \ldots 16,$ where $$e_k = \begin{bmatrix} 0_{r(k-1) \times r} \\ I_{r \times r} \\ 0_{r(L-k) \times r} \end{bmatrix}.$$

4Tx Codebook Enhancements for LTE

In the following section, possible 4Tx codebook enhancement alternatives for LTE Release 12 are disclosed. In these examples, $\tilde{e}_i$, is a 4×1 vector with all zero entries except for the i-th element which has value 1.

Rank-1/2

For a rank-1/2 codebook, the following two alternatives are possible.

Alt-1:

Reusing the 8Tx GoB design with N=32 over-sampled beams and 4 adjacent beams per grid, the following 4Tx codebook can be considered.

$$B = [\, b_0 \quad b_1 \quad \cdots \quad b_{31}\,], \quad (99)$$

$$[B]_{1+m,1+n} = e^{j\frac{2\pi mn}{32}},$$

$$m = 0, \ldots \frac{N_i}{2} - 1,$$

$$n = 0, 1, \cdots, 31$$

$$X^{(k)} \in \quad (100)$$

$$\{[\,b_{2k \bmod 32} \quad b_{(2k+1) \bmod 32} \quad b_{(2k+2) \bmod 32} \quad b_{(2k+3) \bmod 32}\,] : k = 0, 1, \cdots, 15\}$$

$$W_1^{(k)} = \begin{bmatrix} X^{(k)} & 0 \\ 0 & X^{(k)} \end{bmatrix} \quad (101)$$

Codebook 1: $C_1 = \{W_1^{(0)}, W_1^{(1)}, W_1^{(2)}, \ldots, W_1^{(15)}\}$ (102)

Rank-1: 4-bit)

$$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}\right\} \quad (103)$$

$$Y \in \{\tilde{e}_1, \tilde{e}_2, \tilde{e}_3, \tilde{e}_4\} \quad (104)$$

Rank-2: 4-bit)

$$W_2 \in C_2 = \left\{\frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix}\right\} \quad (105)$$

$$(Y_1, Y_2) \in \quad (106)$$

$$\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\},$$

Rank-2: 3-bit)

For rank-2, if a (3-bit) $W_2$ is preferred, $(Y_1, Y_2)$ can be changed to:

$$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4)\}. \quad (107)$$

Each $W_1$ matrix is constructed by a set of adjacent DFT beams and covers a narrow range of angle-of-departures/arrivals. The fundamental consideration is based the feedback of wideband/long-term channel based on $W_1$ matrix, and the fed back $W_1$ matrix in a properly designed $C_1$ codebook should be able to reflect the wideband AoA/AoDs with sufficient accuracy. For instance, most macro base stations in cellular communication systems are elevated on a cell tower and likely have a direct line-of-sign to the UE, where the angle of incoming radio signals to a UE is within in a small range. Hence, the wideband $W_1$ comprising a set of adjacent beams can be used to cover the range of incoming radio signals on the wideband, whereas the narrowband $W_2$ codebook can be used to select a specific beam on each subband. This $W_1$ design is particular suitable to macro base station with narrowly spaced antennas, propagation channel with sufficient line-of-sights, and perfectly calibrated base station antennas.

Alt-2:

A rank-1/2 codebook comprises two components, where $W_1$ structures are different in each component. For the first 8 $W_1$ matrices, Xn comprise four adjacent DFT beams with over-sampling rate of N=16. For the last 8 $W_1$ matrices, Xn comprise four distributed non-adjacent DFT beams uniformly sampling the [0, 360] angle of arrival sub-space. This provides wider angular spread coverage and may be beneficial to large timing misalignment error.

The $W_1$ codebook therefore can be given by:

$i_1 = 0, 1, \ldots, 7$:

$$X^{(i_1)} \in \{[\,b_{2i_1 \bmod 16} \quad b_{(2i_1+1) \bmod 16} \quad b_{(2i_1+2) \bmod 16} \quad b_{(2i_1+3) \bmod 16}\,]\}, \quad (108)$$

$$b_n(m+1) = e^{j\frac{2\pi mn}{16}}, \quad (109)$$

$$n = 0, 1, \cdots, 15,$$

$$m = 0, .1$$

$i_1 = 8, 9, \ldots, 15$:

$$X^{(i_1)} \in \{[\,b_{(i_1-8) \bmod 32} \quad b_{(i_1-8)+8 \bmod 32} \quad b_{(i_1-8)+16 \bmod 32} \quad b_{(i_1-8)+24 \bmod 32}\,]\}, \quad (110)$$

$$b_n(m+1) = e^{j\frac{2\pi mn}{32}}, \quad (111)$$

$$n = 0, 1, \cdots, 31,$$

$$m = 0, .1$$

As can be seen, for the last eight $W_1$ matrices, each $W_1$ matrix in codebook $C_1$ is comprised of four non-adjacent DFT beams. The four DFT beams in each $W_1$ matrix are widely spaced and uniformly distributed in the [0,360] DFT subspace to cover a wide range of angle-of-arrivals/departures. The DFT beams in a first $W_1$ matrix are rotated by a small angle against four DFT beams in a second $W_1$ matrix. More specifically, the $W_1$ matrices comprising widely spaced DFT beams are summarized as $$X_1^{(8)} \in \{[\,b_0 \quad b_8 \quad b_{16} \quad b_{24}\,]\} \quad (112)$$

$$X_1^{(9)} \in \{[\,b_1 \quad b_9 \quad b_{17} \quad b_{25}\,]\}$$

$$\cdots$$

$$X_1^{(15)} \in \{[\,b_7 \quad b_{15} \quad b_{23} \quad b_{31}\,]\}$$

Such a design framework is particularly beneficial in uses cases (e.g., widely spaced antenna components, un-calibrated antenna array, rich multipath scattering environment) where the angle-of-arrival/departures of the incoming wireless signals are distributed in a wide range. For instance, in a heterogeneous deployment scenario where dense small cells are overlaid on top of macro base station on the same frequency, the multipath radio signals received by a UE are reflected by numerous scattering objects surrounding the UE (e.g., building, cars). Have widely spaced and non-adjacent DFT beams in $W_1$ ensures that all incoming signals from different angles can be properly captured. As another use case, it is noted that the transmitter timing at different antennas on a base station shall be synchronized by careful timing alignment calibration. In practice, perfect timing alignment cannot always be guaranteed at a base station, especially for low-cost low-power small base stations (e.g. pico-cells, femto-cells) with cheaper RF components. In 3GPP LTE, a maximum 65 nano-second downlink transmission timing misalignment requirement is set forth for all base stations. A consequence of misaligned antenna timing in the time domain is the increased channel variation on different OFDM subcarriers in the frequency domain, and the main DFT beam angle on one frequency subband can be significantly different than the main DFT beam angle on another subband. In this case, having non-adjacent widely spaced DFT beams in the $W_1$ matrix ensures that the wideband angle-of-arrival/departures can be more reliably covered, resulting in higher feedback accuracy.

The $W_2$ codebook for rank-1 (4-bit) may be given by:

$$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\} \quad (113)$$

$$Y \in \{\tilde{e}_1, \tilde{e}_2, \tilde{e}_3, \tilde{e}_4\} \quad (114)$$

The $W_2$ codebook for rank-2 (4-bit) may be given by:

For $W_2$ corresponding to $i_1=0,1,\ldots,7$ $$W_2 \in C_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\} \quad (115)$$

$$(Y_1, Y_2) \in \quad (116)$$

$$\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$$

If a (3-bit) $W_2$ is preferred, $(Y_1, Y_2)$ may be changed to:

$$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4)\} \quad (117)$$

For $W_2$ corresponding to $i_1=8, 9, \ldots, 15$ $$W_2 \in C_2 = \left\{ \begin{array}{l} \frac{1}{\sqrt{2}}\begin{bmatrix} Y_1 & Y_2 \\ Y_1 & Y_2 \end{bmatrix}, \frac{1}{\sqrt{2}}\begin{bmatrix} Y_1 & Y_2 \\ Y_1 & -Y_2 \end{bmatrix}, \\ \frac{1}{\sqrt{2}}\begin{bmatrix} Y_1 & Y_2 \\ -Y_1 & Y_2 \end{bmatrix}, \frac{1}{\sqrt{2}}\begin{bmatrix} Y_1 & Y_2 \\ -Y_1 & -Y_2 \end{bmatrix}, \\ \frac{1}{\sqrt{2}}\begin{bmatrix} Y_1 & Y_2 \\ jY_1 & jY_2 \end{bmatrix}, \frac{1}{\sqrt{2}}\begin{bmatrix} Y_1 & Y_2 \\ jY_1 & -jY_2 \end{bmatrix}, \\ \frac{1}{\sqrt{2}}\begin{bmatrix} Y_1 & Y_2 \\ -jY_1 & jY_2 \end{bmatrix}, \frac{1}{\sqrt{2}}\begin{bmatrix} Y_1 & Y_2 \\ -jY_1 & -jY_2 \end{bmatrix} \end{array} \right\} \quad (118)$$

$$(Y_1, Y_2) \in \{(\tilde{e}_1, \tilde{e}_3), (\tilde{e}_2, \tilde{e}_4)\} \quad (119)$$

If a (3-bit) $W_2$ is preferred, the $W_2$ codebook may be changed to $$W_2 \in C_2 = \quad (120)$$

$$\left\{ \frac{1}{\sqrt{2}}\begin{bmatrix} Y_1 & Y_2 \\ Y_1 & Y_2 \end{bmatrix}, \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ -Y_1 & Y_2 \end{bmatrix}, \frac{1}{\sqrt{2}}\begin{bmatrix} Y_1 & Y_2 \\ -Y_1 & -Y_2 \end{bmatrix} \right\}$$

$$(Y_1, Y_2) \in \{(\tilde{e}_1, \tilde{e}_3), (\tilde{e}_2, \tilde{e}_4)\} \quad (121)$$

or $$W_2 \in C_2 = \left\{ \begin{array}{l} \frac{1}{\sqrt{2}}\begin{bmatrix} Y_1 & Y_2 \\ Y_1 & Y_2 \end{bmatrix}, \frac{1}{\sqrt{2}}\begin{bmatrix} Y_1 & Y_2 \\ Y_1 & -Y_2 \end{bmatrix}, \\ \frac{1}{\sqrt{2}}\begin{bmatrix} Y_1 & Y_2 \\ -Y_1 & Y_2 \end{bmatrix}, \frac{1}{\sqrt{2}}\begin{bmatrix} Y_1 & Y_2 \\ -Y_1 & -Y_2 \end{bmatrix}, \\ \frac{1}{\sqrt{2}}\begin{bmatrix} Y_1 & Y_2 \\ jY_1 & jY_2 \end{bmatrix}, \frac{1}{\sqrt{2}}\begin{bmatrix} Y_1 & Y_2 \\ jY_1 & -jY_2 \end{bmatrix}, \\ \frac{1}{\sqrt{2}}\begin{bmatrix} Y_1 & Y_2 \\ -jY_1 & jY_2 \end{bmatrix}, \frac{1}{\sqrt{2}}\begin{bmatrix} Y_1 & Y_2 \\ -jY_1 & -jY_2 \end{bmatrix} \end{array} \right\} \quad (122)$$

$$(Y_1, Y_2) \in \{(\tilde{e}_1, \tilde{e}_3)\} \quad (123)$$

or $$\{(\tilde{e}_2, \tilde{e}_4)\}$$

In one embodiment, the new rank-1/2 codebook designs set forth above may be incorporated into an LTE system complying with LTE Release 12. A subset of precoders in the proposed codebooks above may be used to construct a new Release 12 4Tx codebook, for either rank-1 or rank-2. For example, the $W_1$ codebook may be constructed by $W_1$ matrices only comprising widely spaced DFT beams, e.g., $i_2=8, 9, \ldots 15$ in Equation (110)-(111).

Figure 6:
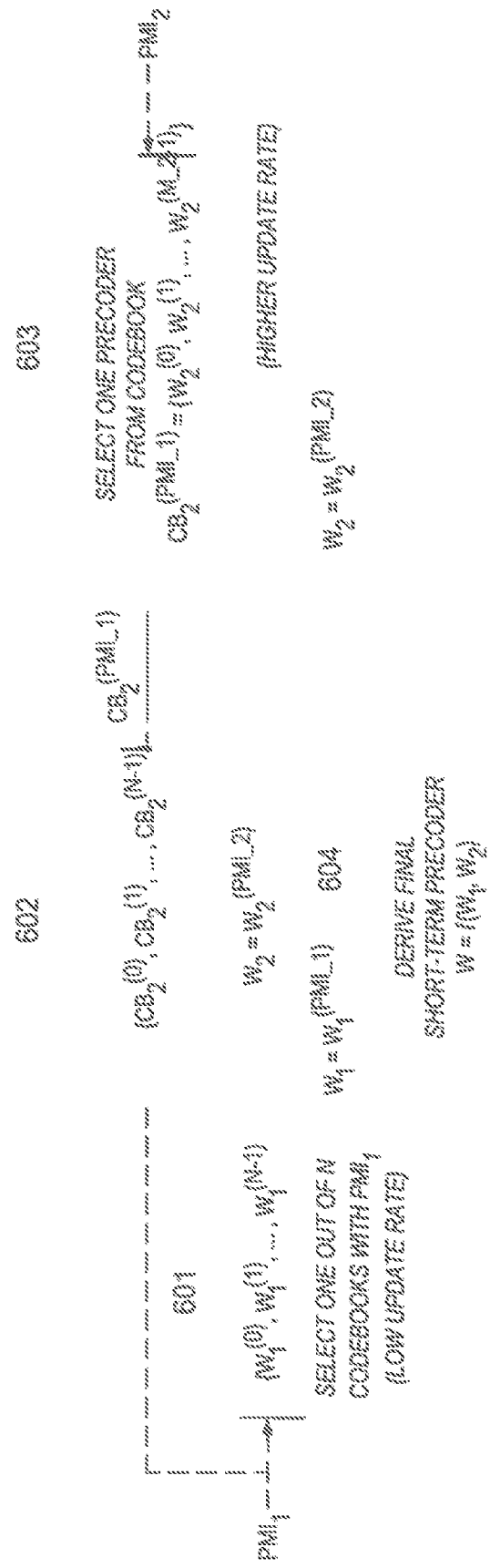
FIG. 6 illustrates the technique used in downlink LTE-Advanced (LTE-A).

FIG. 6 illustrates the precoding matrix/vector selection process according to one embodiment. The final precoding matrix/vector is a function of two PMIs:

$$W = f(PMI_1, PMI_2) \quad (124)$$

where $PMI_1$ is updated at a significantly less frequent rate than $PMI_2$. $PMI_1$ is intended for the entire system bandwidth while $PMI_2$ can be frequency-selective.

FIG. 6 illustrates the technique used in downlink LTE-Advanced (LTE-A). The UE selects $PMI_1$ and $PMI_2$ and hence $W_1$ and $W_2$ in a manner similar to the LTE feedback paradigm.

The UE first selects the first precoder codebook $W_1$ in block 601 based on the long-term channel properties such as spatial covariance matrix such as in a spatial correlation domain from an input of $PMI_1$. This is done in a long-term basis consistent with the fact that spatial covariance matrix needs to be estimated over a long period of time and in a wideband manner.

Conditioned upon $W_1$, the UE selects $W_2$ based on the short-term (instantaneous) channel. This is a two stage process. In block 602, a set of codebooks $CB_2^{(0)}$ to $CB_2^{(N-1)}$ is selected based upon the $PMI_1$ input. Block 603 selects one precoder corresponding to the selected codebook $CB_2^{(PMI_1)}$ and $PMI_2$. This selection may be conditioned upon the selected rank indicator (RI). Alternatively, RI can be selected jointly with $W_2$. Block 604 takes the selected $W_1$ and $W_2$ and forms the function $f(W_1, W_2)$.

$PMI_1$ and $PMI_2$ are reported to the base station (eNodeB) at different rates and/or different frequency resolutions.

Based on this design framework, several types of codebook design are described herein. While each type can stand alone, it is also possible to use different types in a single codebook design especially if the design is intended for different scenarios. A simple yet versatile design can be devised as follows:

$PMI_1$ selects one of the N codebooks $W_1$ as indicated above.

$PMI_2$ selects at least one of the column vectors of W, wherein the number of selected column vectors is essentially the recommended transmission rank (RI).

This design allows construction of N different scenarios where the codebook $W_1$ for each scenario is chosen to contain a set of basis vectors for a particular spatial channel characteristic $W_2$. While any two-dimensional function can be used in equation (124), this disclosure assumes a product (matrix multiplication) function $f(x,y)=xy$. Thus the final short-term precoding matrix/vector is computed as a matrix product of $W_1$ and $W_2$: $W=W_1W_2$.

Figure 7:
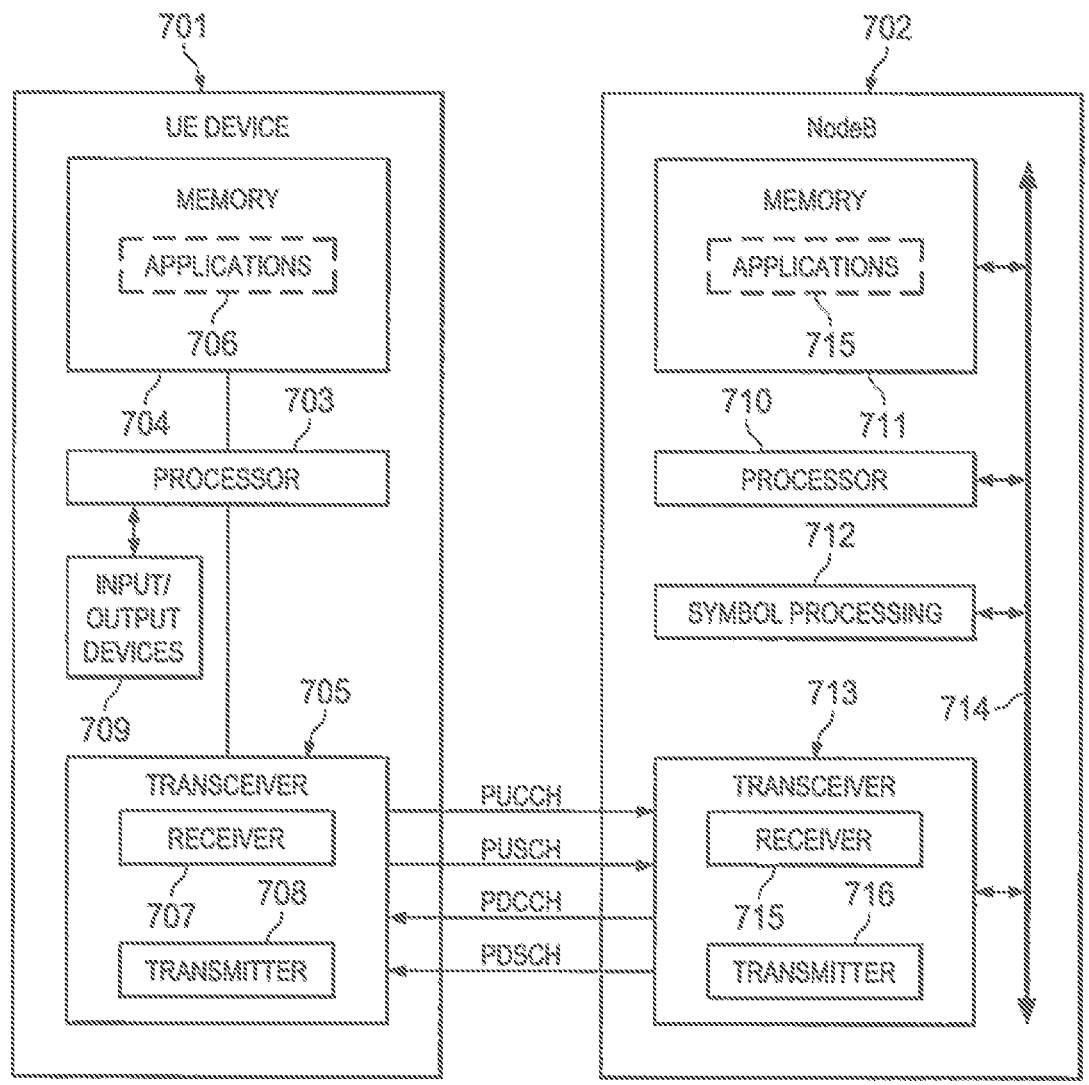
FIG. 7 is a block diagram illustrating internal details of a mobile UE and an eNodeB in an exemplary network system.

FIG. 7 is a block diagram illustrating internal details of a mobile UE 701 and an eNodeB 702 in the network system of FIG. 1. Mobile UE 701 may represent any of a variety of devices such as a server, a desktop computer, a laptop computer, a cellular phone, a Personal Digital Assistant (PDA), a smart phone or other electronic devices. In some embodiments, the electronic mobile UE 701 communicates with eNodeB 702 based on a LTE or Evolved Universal Terrestrial Radio Access Network (E-UTRAN) protocol. Alternatively, another communication protocol now known or later developed can be used.

Mobile UE 701 comprises a processor 703 coupled to a memory 704 and a transceiver 705. The memory 704 stores (software) applications 706 for execution by the processor 703. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 701 to transmit UL signals to eNodeB (base-station) 702 periodically or continuously via the transceiver 705. In at least some embodiments, the mobile UE 701 identifies a Quality of Service (QoS) requirement when requesting an uplink resource from eNodeB 702. In some cases, the QoS requirement may be implicitly derived by eNodeB 702 from the type of traffic supported by the mobile UE 701. As an example, VOIP and gaming applications often involve low-latency uplink (UL) transmissions while High Throughput (HTP)/Hypertext Transmission Protocol (HTTP) traffic can involve high-latency uplink transmissions.

Transceiver 705 includes uplink logic which may be implemented by execution of instructions that control the operation of the transceiver. Some of these instructions may be stored in memory 704 and executed when needed by processor 703. As would be understood by one of skill in the art, the components of the uplink logic may involve the physical (PHY) layer and/or the Media Access Control (MAC) layer of the transceiver 705. Transceiver 705 includes one or more receivers 707 and one or more transmitters 708.

Processor 703 may send or receive data to various input/output devices 709. A subscriber identity module (SIM) card stores and retrieves information used for making calls via the cellular system. A Bluetooth baseband unit may be provided for wireless connection to a microphone and headset for sending and receiving voice data. Processor 703 may send information to a display unit for interaction with a user of mobile UE 701 during a call process. The display may also display pictures received from the network, from a local camera, or from other sources such as a Universal Serial Bus (USB) connector. Processor 703 may also send a video stream to the display that is received from various sources such as the cellular network via RF transceiver 705 or the camera.

During transmission and reception of voice data or other application data, transmitter 707 may be or become non-synchronized with its serving eNodeB. In this case, it sends a random access signal. As part of this procedure, it determines a preferred size for the next data transmission, referred to as a message, by using a power threshold value provided by the serving eNodeB, as described in more detail above. In this embodiment, the message preferred size determination is embodied by executing instructions stored in memory 704 by processor 703. In other embodiments, the message size determination may be embodied by a separate processor/memory unit, by a hardwired state machine, or by other types of control logic, for example.

eNodeB 702 comprises a processor 710 coupled to a memory 711, symbol processing circuitry 712, and a transceiver 713 via backplane bus 714. The memory stores applications 715 for execution by processor 710. The applications could comprise any known or future application useful for managing wireless communications. At least some of the applications 715 may direct eNodeB 702 to manage transmissions to or from mobile UE 701.

Transceiver 713 comprises an uplink Resource Manager, which enables eNodeB 702 to selectively allocate uplink Physical Uplink Shared CHannel (PUSCH) resources to mobile UE 701. As would be understood by one of skill in the art, the components of the uplink resource manager may involve the physical (PHY) layer and/or the Media Access Control (MAC) layer of the transceiver 713. Transceiver 713 includes at least one receiver 715 for receiving transmissions from various UEs within range of eNodeB 702 and at least one transmitter 716 for transmitting data and control information to the various UEs within range of eNodeB 702.

The uplink resource manager executes instructions that control the operation of transceiver 713. Some of these instructions may be located in memory 711 and executed when needed on processor 710. The resource manager controls the transmission resources allocated to each UE 701 served by eNodeB 702 and broadcasts control information via the PDCCH.

Symbol processing circuitry 712 performs demodulation using known techniques. Random access signals are demodulated in symbol processing circuitry 712.

During transmission and reception of voice data or other application data, receiver 715 may receive a random access signal from a UE 701. The random access signal is encoded to request a message size that is preferred by UE 701. UE 701 determines the preferred message size by using a message threshold provided by eNodeB 702. In this embodiment, the message threshold calculation is embodied by executing instructions stored in memory 711 by processor 710. In other embodiments, the threshold calculation may be embodied by a separate processor/memory unit, by a hardwired state machine, or by other types of control logic, for example. Alternatively, in some networks the message threshold is a fixed value that may be stored in memory 711, for example. In response to receiving the message size request, eNodeB 702 schedules an appropriate set of resources and notifies UE 701 with a resource grant.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:

receiving one or more precoding matrix indicator (PMI) signals from a remote transceiver; and generating a precoding matrix W equal to a matrix multiplication of two matrices W1 and W2, where said precoding matrix W is applicable to precoding one or more layers of data streams, matrix W1 selected from a first codebook C1 based on a first group of bits in the PMI signals, and matrix W2 selected from a second codebook C2 based on a second group of bits in the PMI signals, wherein the first codebook C1 comprises the following W1 matrices:

$$B = [b_0 \ b_1 \ \ldots \ b_{N-1}], [B]_{1+m,1+n} = e^{j\frac{2\pi mn}{N}},$$

$$m = 0, \ldots, \frac{N_t}{2} - 1, n = 0, 1, \ldots, N-1,$$

$$X^{(k)} \in \left\{ [b_{k \bmod N} \ b_{(k+N/4) \bmod N} \ b_{(k+2\times N/4) \bmod N} \ b_{(k+3\times N/4) \bmod N}] : k = 0, 1, \ldots, \frac{N}{4} - 1 \right\}$$

$$W_1^{(k)} = \begin{bmatrix} X^{(k)} & 0 \\ 0 & X^{(k)} \end{bmatrix},$$

$N_t \geq 4$ is the number of transmit antennas corresponding to W,

N is an integer number greater than or equal to Nr.

2. The method of claim 1, wherein the number of layers of the data stream is one, and wherein the second codebook C2 comprises at least the following matrix:

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

$$Y \in \{\tilde{e}_1, \tilde{e}_2, \tilde{e}_3, \tilde{e}_4\},$$

and wherein $\tilde{e}_i$ is a 4×1 vector with all zero entries except for the i-th element which has value 1.

3. The method of claim 1, wherein the number of layers of the data stream is two, and wherein the second codebook C2 comprises at least the following matrix:

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$(Y_1, Y_2) \in$ $\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\},$ wherein $\tilde{e}_i$ is a 4×1 vector with all zero entries except for the i-th element which has value 1.

4. The method of claim 1, wherein the number of layers of the data stream is two, and wherein the second codebook C2 comprises at least the following matrix:

$$W_2 \in C_2 =$$
$$\left\{ \frac{1}{\sqrt{2}} \begin{bmatrix} Y_1 & Y_2 \\ Y_1 & Y_2 \end{bmatrix}, \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ -Y_1 & -Y_2 \end{bmatrix} \right\}$$

$(Y_1, Y_2) \in \{(\tilde{e}_1, \tilde{e}_3), (\tilde{e}_2 \tilde{e}_4)\}$ wherein $\tilde{e}_i$ is a 4×1 vector with all zero entries except for the i-th element which has value 1.

5. The method of claim 1, wherein the number of layers of the data stream is two, and wherein the second codebook C2 comprises at least the following matrix:

$$W_2 \in C_2 = \left\{ \begin{array}{l} \frac{1}{\sqrt{2}} \begin{bmatrix} Y_1 & Y_2 \\ Y_1 & Y_2 \end{bmatrix}, \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ -Y_1 & Y_2 \end{bmatrix}, \frac{1}{\sqrt{2}} \begin{bmatrix} Y_1 & Y_2 \\ -Y_1 & -Y_2 \end{bmatrix} \\ \frac{1}{\sqrt{2}} \begin{bmatrix} Y_1 & Y_2 \\ jY_1 & jY_2 \end{bmatrix}, \frac{1}{\sqrt{2}} \begin{bmatrix} Y_1 & Y_2 \\ jY_1 & -jY_2 \end{bmatrix}, \frac{1}{\sqrt{2}} \begin{bmatrix} Y_1 & Y_2 \\ -jY_1 & jY_2 \end{bmatrix}, \frac{1}{\sqrt{2}} \begin{bmatrix} Y_1 & Y_2 \\ -jY_1 & -jY_2 \end{bmatrix} \end{array} \right\}$$

$(Y_1, Y_2) \in \{(\tilde{e}_1, \tilde{e}_3)\} \text{ or } \{(\tilde{e}_2, \tilde{e}_4)\}$ wherein $\tilde{e}_i$ is a 4×1 vector with all zero entries except for the i-th element which has value 1.

\* \* \* \* \*